US008760501B2

(12) United States Patent
Oohchida et al.

(10) Patent No.: US 8,760,501 B2
(45) Date of Patent: Jun. 24, 2014

(54) STEREO CAMERA APPARATUS AND VEHICLE-MOUNTABLE MONITORING APPARATUS USING SAME

(75) Inventors: Shigeru Oohchida, Tokyo (JP); Shin Aoki, Yokohama (JP); Masahiro Fujimoto, Yokohama (JP); Hideaki Hirai, Yokohama (JP); Yasufumi Yamada, Yokohama (JP); Nobuhiro Morita, Yamato (JP)

(73) Assignee: Ricoh Company, Ltd., Tokyo (JP)

( * ) Notice: Subject to any disclaimer, the term of this patent is extended or adjusted under 35 U.S.C. 154(b) by 540 days.

(21) Appl. No.: 12/776,697

(22) Filed: May 10, 2010

(65) Prior Publication Data

US 2010/0283837 A1 Nov. 11, 2010

(30) Foreign Application Priority Data

May 11, 2009 (JP) .................. 2009-114153

(51) Int. Cl.
G06T 7/00 (2006.01)
(52) U.S. Cl.
CPC .................... G06T 7/0075 (2013.01)
USPC ..................... 348/47; 348/E13.074
(58) Field of Classification Search
CPC ............... G06T 7/0075; G06T 2207/10012; H04N 13/0239; H04N 13/0242; H04N 13/0296; G02B 1/005; G02B 5/3041; G02B 27/1066; G02B 27/283; G03B 35/08; B60R 1/00; B60R 2300/107
USPC ........ 348/348.047, 48, 49, 50, 51, 52, 54, 57, 348/58, 60, 47, E13.074
IPC ...................................... G01B 11/00
See application file for complete search history.

(56) References Cited

U.S. PATENT DOCUMENTS 4,671,613 A * 6/1987 Buhrer ..................... 359/485.03
6,038,071 A 3/2000 Chikazawa
(Continued)

FOREIGN PATENT DOCUMENTS

JP 5-265547 10/1993
JP 11-39596 2/1999
(Continued)

OTHER PUBLICATIONS

Translation to JP 2006214735, Kuwajima et al.*

(Continued)

Primary Examiner — Richard Torrente
Assistant Examiner — Frank Huang
(74) Attorney, Agent, or Firm — Oblon, Spivak, McClelland, Maier & Neustadt, L.L.P.

(57) ABSTRACT

A stereo camera apparatus includes a first image capturing unit having first and second lens units, a first light synthesis unit, a first area-divided filter, and a first image capturing element. The first light synthesis unit and the first area-divided filter guide S-polarized and P-polarized light components to the first image capturing element. The second image capturing unit includes third and fourth lens units, a second light synthesis unit, a second area-divided filter, and a second image capturing element. The second light synthesis unit and the second area-divided filter guide S-polarized and P-polarized light components to the second image capturing element. The control unit includes first and second controllers to compute three-dimensional data of object using the S-polarized and P-polarized light component images, respectively.

11 Claims, 11 Drawing Sheets

(56) References Cited

U.S. PATENT DOCUMENTS 6,546,208 B1 * 4/2003 Costales .................. 396/324
2002/0140835 A1   10/2002 Silverstein

FOREIGN PATENT DOCUMENTS

| | | |
|---|---|---|
| JP | 2004-258266 | 9/2004 |
| JP | 2006-214735 | 8/2006 |
| JP | 2006214735 A * | 8/2006 |
| JP | 2010-2233 | 1/2010 |
| WO | WO 02/078324 A2 | 10/2002 |
| WO | WO 2008006180 A1 * | 1/2008 ............... A61B 1/04 |

OTHER PUBLICATIONS

Extended European Search Report Issued May 14, 2013 in Patent Application No. 10161326.3.

* cited by examiner

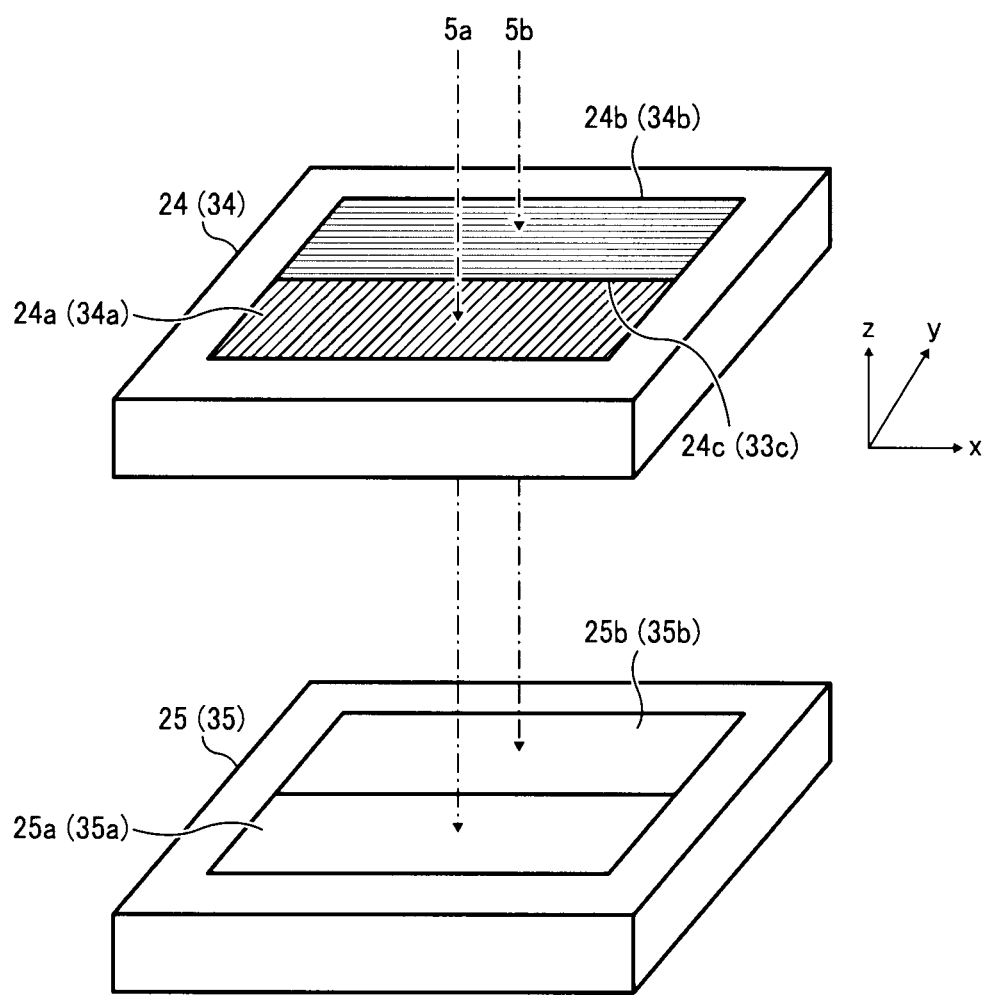

PARALLAX S=B · f/(A · δ)

FIG. 8
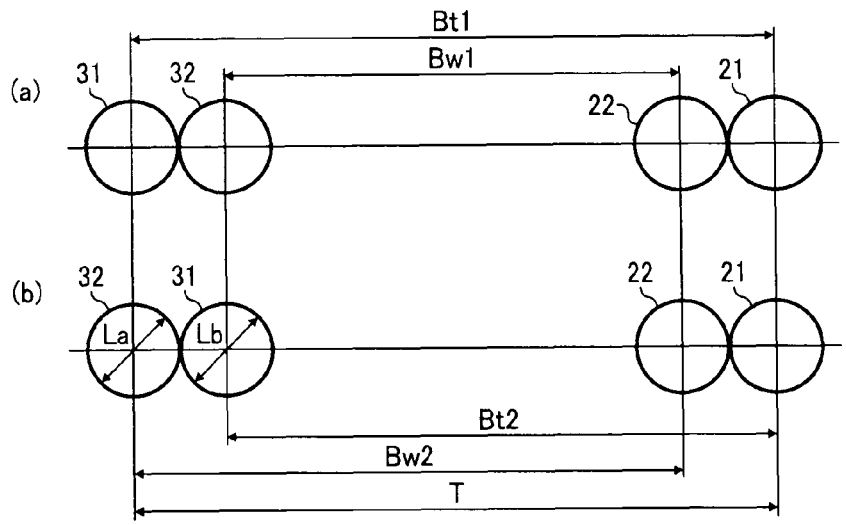
FIG. 9
(a) SAME DIRECTION SET FOR FACES
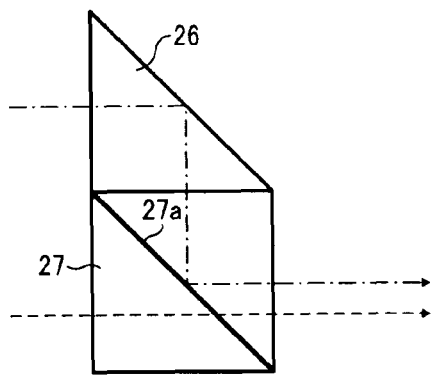
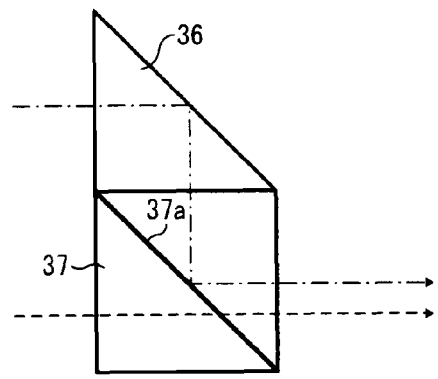
(b) DIFFERENT DIRECTION SET FOR FACES
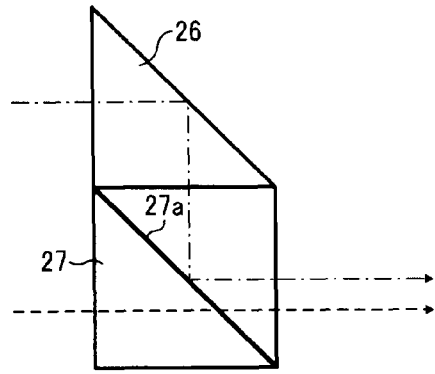
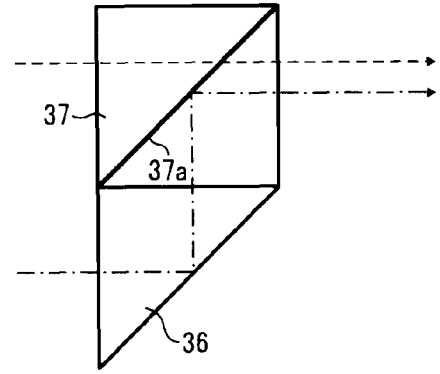

STEREO CAMERA APPARATUS AND VEHICLE-MOUNTABLE MONITORING APPARATUS USING SAME

CROSS-REFERENCE TO RELATED APPLICATIONS

This application claims priority to Japanese Patent Application No. 2009-114153, filed on May 11, 2009 in the Japan Patent Office, which is hereby incorporated by reference herein in its entirety.

BACKGROUND OF THE INVENTION

1. Field of the Invention

The present invention relates to a stereo camera apparatus and a vehicle-mountable monitoring apparatus using the stereo camera apparatus, and more particularly, to a compact stereo camera apparatus of reduced size that can enhance measurable distance range and angle of view.

2. Description of the Background Art

More and more vehicles such as automobiles have been equipped with safety devices to enhance vehicle safety. For example, a forward-watching device, such as a television camera or a laser-equipped radar unit, may be mounted on a vehicle to detect vehicles and/or obstructions or objects in front of the vehicle. The information gained by such detection can be used to determine a degree of danger or hazard level such as collision risk and activate a warning signal to a driver, activate an automatic braking system to decrease vehicle speed, or automatically increase or decrease vehicle speed (or cruising speed) to maintain a predetermined vehicle-to-vehicle distance with the vehicle ahead. Research into and development of such technologies is being actively pursued, under the concept of an advanced safety vehicle (ASV), for example.

Such technologies, which can detect objects in front of the vehicle using images captured by a television camera mounted on the vehicle (e.g., an automobile), are known. For example, JP-H05-265547-A discloses one vehicle-mountable monitoring apparatus that mounts four stereo cameras: two stereo cameras for long-range (telephoto) detection using charge coupled devices (CODs), and two more stereo cameras for short range (wide-angle) detection also using CODs. Each of the stereo cameras captures images of one or more objects, and the captured images are processed to compute distance to the objects from the vehicle as object distance distribution information. The computed object distance distribution information can be further used to compute three-dimensional positions of both objects and road environment, such as road width, for example.

In such a configuration, the long-range stereo cameras have an object detectable range such as from 20 m to 100 m ahead of the vehicle on which they are mounted, and the short-range stereo cameras have an object detectable range such as from 5 m to 30 m, for example.

The stereo cameras for long-range can detect far objects such as 100 m ahead of the vehicle, but cannot detect too-close objects at distances such as 20 m or less ahead of the vehicle. On the other hand, the stereo cameras for short range can detect close objects ahead of the vehicle by using a wide-angle lens, which have a broader field of view and thus can detect objects in a broader lateral range to the sides of the vehicle. Further, the two stereo cameras for short range are disposed closer to each other and can thus detect objects close to the vehicle.

To maintain a broad field of view for short distance and long distance, the two stereo cameras for long range and the two stereo cameras for short range may be used selectively depending on changes in vehicle environment and conditions. For example, when a vehicle is traveling on a highway at high speed, the stereo cameras for long-range detection are activated for monitoring the road in front of the vehicle, whereas when the vehicle is traveling on a local road at low speed, the stereo cameras for short range are activated for monitoring the road in front of the vehicle.

Further, JP-H11-39596-A discloses another vehicle-mountable monitoring apparatus, in which two stereo cameras for long range and two stereo cameras for short range are concurrently activated to capture images of objects, instead of selectively using the stereo cameras for long- and short-range depending on changes in vehicle environment and road conditions. Such vehicle-mountable monitoring apparatus prepares a distance-information included image for long range and a distance-information included image for short range. The distance-information included image for long range is segmented into a plurality of sections (e.g., a grid), in which one whole captured image is divided into multiple sections of a given size. Similarly, the distance-information included image for short range is also segmented into a plurality of sections (e.g., a grid) of a given size for dividing one captured image into the plurality of sections, in which one whole captured image is divided into multiple sections having a given size. Then, for each of the sections, image data on or above a road face is extracted as data for three-dimensional objects and distance to the object is computed.

As above described, the vehicle-mountable monitoring apparatus mounted on vehicle for watching a broader field of view for short distance and long distance may have a relatively greater size. This factor is important because, generally, stereo cameras are disposed at a front top position in a vehicle, such as the position of the rear-view mirror of an automobile. The position of rear-view mirror is close to a head position of the driver's seat and the passenger seat in view of the function of the rear-view mirror, which is used to provide a view to the rear of the vehicle. A big stereo camera mounted at such rear-view mirror position may oppress the driver and/or the passenger and can pose a safety risk for both driver and passenger.

JP-2004-258266-A discloses a stereo camera having two lenses, mirrors disposed in a light path for reflecting light coming from the two lenses, and one image capturing element. When light enters and passes one lens, the light is reflected by one mirror and guided to the single joint image capturing element. When light enters and passes the other lens, the light is reflected by the other mirror and also guided to the single joint image capturing element. Such a configuration can reduce the number of image capturing elements and reduce the size of stereo camera. The smaller the size of the stereo camera, the smaller the moment force of stereo camera, in which the stereo camera can attain a higher rigidity when vibration or acceleration forces act on the stereo camera.

As described above, JP-H05-265547-A and JP-H11-39596-A disclose vehicle-mountable monitoring apparatuses using two stereo cameras for long range and two stereo cameras for short range, meaning four stereo cameras in total, to ensure a broader field of view at both long and short ranges. However, such a configuration requires a greater number of parts for the optical systems. For example, the number of lenses and image capturing elements may be twice or more that of ordinary stereo cameras, by which manufacturing cost of the vehicle-mountable monitoring apparatuses may increase.

Also as described above, JP-2004-258266-A discloses a stereo camera using two lenses and one image capturing element, in which a light path coming from the lenses to the image capturing element is tilted for some angle, by which a size of stereo camera is reduced, and manufacturing cost is also reduced. In such a stereo camera, a baseline length set between two lenses (i.e., an interval of two lenses) may be set shorter so that one image capturing element can be used for two lenses. However, due to the principle of triangulation, a shorter baseline length may hinder a distance measurement for far objects.

SUMMARY

In one aspect of the present invention, a stereo camera apparatus, including a first image capturing unit to capture an image of object, a second image capturing unit to capture an image of object, which is spaced a given distance from the first image capturing unit, and a control unit to receive and control processing of data of the image captured by the first image capturing unit and the second image capturing unit, is devised. The first image capturing unit includes a first lens unit including a plurality of single lenses; a second lens unit including a plurality of single lenses, disposed next to the first lens unit; a first light synthesis unit disposed after a light exit side of the first lens unit and second lens unit; a first area-divided filter disposed after a light exit side of the first light synthesis unit; and a first image capturing element disposed after a light exit side of the first area-divided filter. The first lens unit is set parallel to the second lens unit by setting a light axis of the first lens unit parallel to a light axis of the second lens unit. The first light synthesis unit reflects light coming from the first lens unit 90 degrees, and further reflects the light 90 degrees to guide a S-polarized light component of the light to the first area-divided filter. The first light synthesis unit allows and guides a P-polarized light component of the light coming from the second lens unit to the first area-divided filter. The first area-divided filter includes two polarizer area, one polarizer area letting through the S-polarized light component and another polarizer area letting through the P-polarized light component. The first area-divided filter separates the light coming from the first light synthesis unit into the S-polarized light component and the P-polarized light component. The first image capturing element receives the S-polarized light component and the P-polarized light component, separated by the first area-divided filter, to detect a S-polarized light component image and a P-polarized light component image. The second image capturing unit includes a third lens unit including a plurality of single-lenses; a fourth lens unit including a plurality of single-lenses, disposed next to the third lens unit; a second light synthesis unit disposed after a light exit side of the third lens unit and fourth lens unit; a second area-divided filter disposed after a light exit side of the second light synthesis unit; and a second image capturing element disposed after a light exit side of the second area-divided filter. The third lens unit is set parallel to the fourth lens unit by setting a light axis of the third lens unit parallel to a light axis of the fourth lens unit. The second light synthesis unit reflects light coming from the third lens unit 90 degrees, and further reflects the light 90 degrees to guide a S-polarized light component of the light to the second area-divided filter. The second light synthesis unit allows and guides a P-polarized light component of the light coming from the fourth lens unit to the second area-divided filter. The second area-divided filter including two polarizer area, one polarizer area letting through the S-polarized light component and another polarizer area letting through the P-polarized light component. The second area-divided filter separates the light coming from the second light synthesis unit into the S-polarized light component and the P-polarized light component. The second image capturing element receives the S-polarized light component and the P-polarized light component, separated by the second area-divided filter, to detect a S-polarized light component image and a P-polarized light component image. The control unit includes a first controller, and a second controller. The first controller receives the S-polarized light component image detected at the first image capturing element and the second image capturing element to compute three-dimensional position data of an object. The second controller receives the P-polarized light component image detected at the first image capturing element and at the second image capturing element to compute three-dimensional position data of the object.

In another aspect of the present invention, a stereo camera apparatus, including a first image capturing unit to capture an image of object, a second image capturing unit to capture an image of object, which is spaced a given distance from the first image capturing unit, and a control unit to receive and control processing of data of the image captured by the first image capturing unit and the second image capturing unit, is devised. The first image capturing unit includes a first lens unit including a plurality of single lenses; a second lens unit including a plurality of single lenses, disposed next to the first lens unit; a first light synthesis unit disposed after a light exit side of the first lens unit and second lens unit; a first area-divided filter disposed after a light exit side of the first light synthesis unit; and a first image capturing element disposed after a light exit side of the first area-divided filter. The first lens unit is set parallel to the second lens unit by setting a light axis of the first lens unit parallel to a light axis of the second lens unit. The first light synthesis unit reflects light coming from the first lens unit 90 degrees, and further reflects the light 90 degrees to guide a S-polarized light component of the light to the first area-divided filter. The first light synthesis unit allows and guides a P-polarized light component of the light coming from the second lens unit to the first area-divided filter. The first area-divided filter includes two polarizer area, one polarizer area letting through the S-polarized light component and another polarizer area letting through the P-polarized light component. The first area-divided filter separates the light coming from the first light synthesis unit into the S-polarized light component and the P-polarized light component. The first image capturing element receives the S-polarized light component and the P-polarized light component, separated by the first area-divided filter, to detect a S-polarized light component image and a P-polarized light component image. The second image capturing unit includes a third lens unit including a plurality of single-lenses; a fourth lens unit including a plurality of single-lenses, disposed next to the third lens unit; a second light synthesis unit disposed after a light exit side of the third lens unit and fourth lens unit; a second area-divided filter disposed after a light exit side of the second light synthesis unit; and a second image capturing element disposed after a light exit side of the second area-divided filter. The third lens unit is set parallel to the fourth lens unit by setting a light axis of the third lens unit parallel to a light axis of the fourth lens unit. The second light synthesis unit reflects light coming from the third lens unit 90 degrees, and further reflects the light 90 degrees to guide a S-polarized light component of the light to the second area-divided filter. The second light synthesis unit allows and guides a P-polarized light component of the light coming from the fourth lens unit to the second area-divided filter. The second area-divided filter including two polarizer area, one polarizer area letting through the S-polarized light component and another polarizer area letting through the P-polarized light component. The second area-divided filter separates the light coming from the second light synthesis unit into the S-polarized light component and the P-polarized light component. The second image capturing element receives the S-polarized light component and the P-polarized light component, separated by the second area-divided filter, to detect a S-polarized light component image and a P-polarized light component image. The control unit includes a first controller, and a second controller. The first controller receives the S-polarized light component image detected at the first image capturing element and the second image capturing element to compute three-dimensional position data of an object. The second controller receives the P-polarized light component image detected at the first image capturing element and at the second image capturing element to compute three-dimensional position data of the object. The first light synthesis unit includes a prism and a light beam splitter. The prism includes a reflection face to reflect a light path of light 90 degrees. The light beam splitter includes a beam splitter face parallel to the reflection face of the prism. The beam splitter face reflects the S-polarized light component and lets through the P-polarized light component. The prism and the light beam splitter are integrated as one integrated unit. The second light synthesis unit includes a prism and a light beam splitter. The prism includes a reflection face to reflect a light path of light 90 degrees. The light beam splitter includes a beam splitter face parallel to the reflection face of the prism. The beam splitter face reflects the S-polarized light component and lets through the P-polarized light component. The prism and the light beam splitter are integrated as one integrated unit.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 2 illustrates a perspective view of an area-divided filter and an image capturing element;

FIG. 8(a) illustrates a conventional arrangement pattern of lens units for long-range and for short range;

FIG. 8(b) illustrates an arrangement pattern of lens units for long-range and for short range according to an example embodiment;

FIG. 9(a) illustrates one arrangement pattern of light synthesis unit;

FIG. 9(b) illustrates another arrangement pattern of light synthesis unit;

DETAILED DESCRIPTION OF EXEMPLARY EMBODIMENTS

Figure 1:
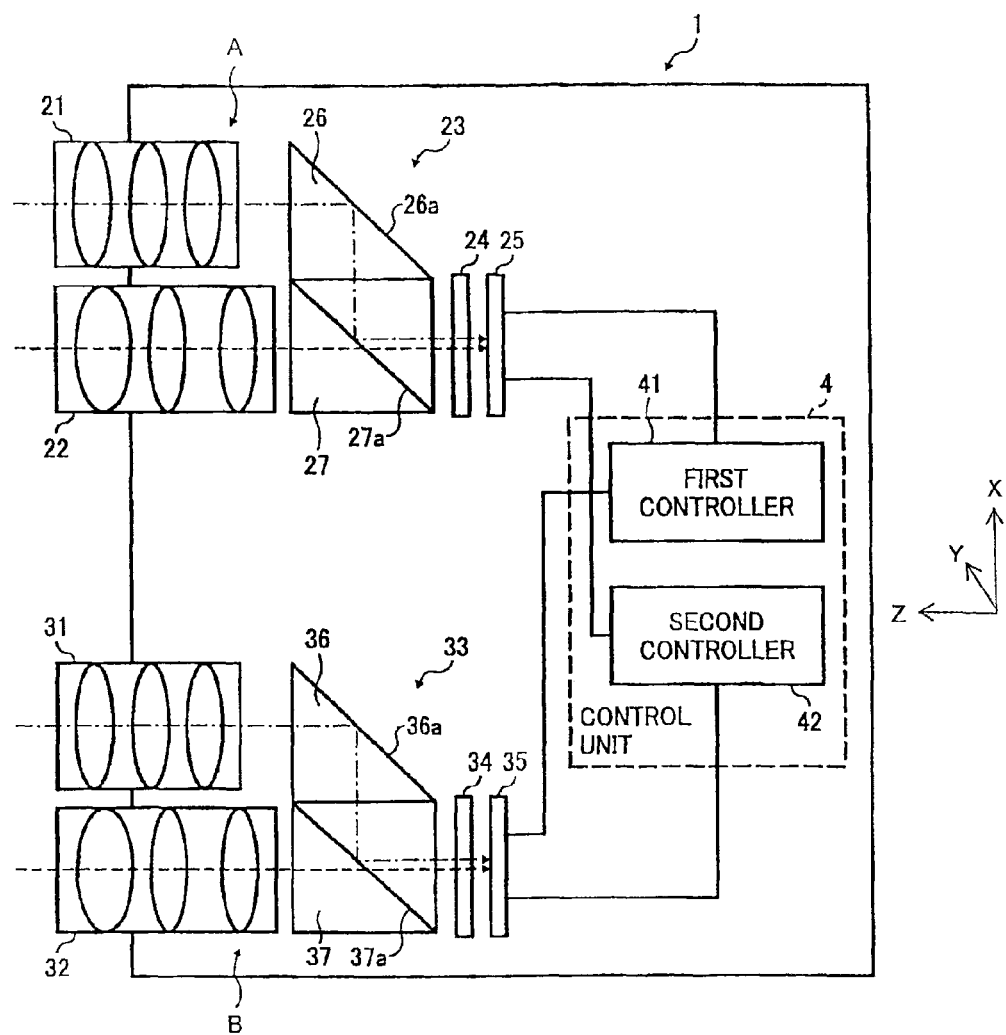
FIG. 1 illustrates a schematic configuration of a stereo camera apparatus according to an example embodiment.

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, Operations, elements, and/or components, but do not preclude the presence or addition of one or more other features, integers, steps, Operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner.

Referring now to the drawings, a stereo camera apparatus according to example embodiments are described hereinafter.

A description is now given to a stereo camera apparatus 1 according to an example embodiment with reference to FIG. 1, which illustrates a schematic configuration of the stereo camera apparatus 1. The stereo camera apparatus 1 may be used to generate a stereo image for "long-range" and a stereo image for "short range." The "long-range" can be referred as "telephoto-range," and the "short range" can be referred as "wide-range" for commercially available stereo camera. The stereo camera apparatus 1 can be also referred to as a monitoring apparatus, a watching apparatus, or the like, for example. As illustrated in FIG. 1, the stereo camera apparatus 1 may include a first image capturing unit A, a second image capturing unit B, and a control unit 4, for example, in which the first image capturing unit A and second image capturing unit B are spaced apart with a given distance L.

The first image capturing unit A may include a first lens unit 21, a second lens unit 22, a first light synthesis unit 23, a first area-divided filter 24, and a first image capturing element 25. The first lens unit 21 may include a plurality of single-lenses, and the second lens unit 22 may include a plurality of single-lenses.

The first light synthesis unit 23 may include a prism 26, and a light beam splitter 27. The prism 26 may include a reflection face 26a, which can reflect light path of light coming from the first lens unit 21 for 90 degrees with respect to a light axis of the first lens unit 21.

The light beam splitter 27 may include a beam splitter face 27a, which is disposed in parallel to the reflection face 26a of the prism 26 with a given distance therebetween. The beam splitter face 27a can reflect one polarized light component while pass through another polarized light component. For example, the beam splitter face 27a reflects the S-polarized light component, and passes the P-polarized light component. Among light reflected by the reflection face 26a of the prism 26, only the S-polarized light component is reflected for 90 degrees at the beam splitter face 27a.

The second lens unit 22 is disposed in front of the light beam splitter 27 while setting a light axis of the second lens unit 22 parallel to a light axis of the first lens unit 21. As such, the first lens unit 21 is set parallel to the second lens unit 22 by setting the light axis of the first lens unit 21 parallel to the light axis of the second lens unit 22, and the first lens unit 21 and the second lens unit 22 may be arranged in close proximity. Among light coming from the second lens unit 22, only the P-polarized light component passes through the beam splitter face 27a of the light beam splitter 27. The first area-divided filter 24 may include two polarizer areas, one of which passes only the S-polarized light component, another one of which passes only the P-polarized light component.

When the S-polarized light component reflected at the beam splitter face 27a of the light beam splitter 27 and the P-polarized light component passed through the beam splitter face 27a enter the first area-divided filter 24, the S-polarized light component and the P-polarized light component are separated by the first area-divided filter 24. The first image capturing element 25 receives and detects the S-polarized light component and the P-polarized light component, separated by the first area-divided filter 24, and outputs image signal for S-polarized light component and the P-polarized light component.

The second image capturing unit B may include a third lens unit 31, a fourth lens unit 32, a second light synthesis unit 33, a second area-divided filter 34, and a second image capturing element 35. The third lens unit 31 may include a plurality of single-lenses, and the fourth lens unit 32 may include a plurality of single-lenses.

The second light synthesis unit 33 may include a prism 36, and the light beam splitter 37. The prism 36 may include a reflection face 36a, which can reflect light path of light coming from the third lens unit 31 for 90 degrees with respect to a light axis of the third lens unit 31.

The light beam splitter 37 may include a beam splitter face 37a, which is disposed in parallel to the reflection face 36a of the prism 36 with a given distance therebetween. The beam splitter face 37a can reflect one polarized light component while pass through another polarized light component. For example, the beam splitter face 37a reflects the S-polarized light component, and passes through the P-polarized light component. Among light reflected by the reflection face 36a of the prism 36, only the S-polarized light component is reflected for 90 degrees at the beam splitter face 37a.

The fourth lens unit 32 is disposed in front of the light beam splitter 37 while setting a light axis of the fourth lens unit 32 parallel to a light axis of the third lens unit 31. As such, the third lens unit 31 is set parallel to the fourth lens unit 32 by setting the light axis of the third lens unit 31 parallel to the light axis of the fourth lens unit 32, and the third lens unit 31 and the fourth lens unit 32 may be arranged in close proximity. Among light coming from the fourth lens unit 32, only the P-polarized light component passes through the beam splitter face 37 of the light beam splitter 37.

The second area-divided filter 34 may include two polarizer areas, one of which passes through only the S-polarized light component, another one of which passes through only the P-polarized light component.

When the S-polarized light component reflected at the beam splitter face 37a of the light beam splitter 37 and the P-polarized light component passed through the beam splitter face 37a enter the second area-divided filter 34, the S-polarized light component and the P-polarized light component are separated by the second area-divided filter 34.

The second image capturing element 35 receives and detects the S-polarized light component and the P-polarized light component, separated by the first area-divided filter 24, and outputs image signal for S-polarized light component and the P-polarized light component.

A description is now given to configuration of the first image capturing unit A and the second image capturing unit B in the stereo camera apparatus 1.

The first lens unit 21 (of the first image capturing unit A) and the third lens unit 31 (of the second image capturing unit B) may have a longer focal length, by which the first lens unit 21 and the third lens unit 31 are used for taking image of object at "long-range." The second lens unit 22 (of the first image capturing unit A) and the fourth lens unit 32 (of the second image capturing unit B) may have a shorter focal length, by which the second lens unit 22 and the fourth lens unit 32 are used for taking image of object at "short range."

Accordingly, a stereo image for short range object can be generated as wide-angle-view image using the second lens unit 22 of the first image capturing unit A and the fourth lens unit 32 of the second image capturing unit B having the shorter focal length. On the other hand, a stereo image for long range object can be generated as narrow-angle-view image using the first lens unit 21 of the first image capturing unit A and the third lens unit 31 of the second image capturing unit B having a longer focal length, in which the prisms 26, 36, and the reflected light beam splitters 27, 37 are disposed along the light path. With such a configuration, design patterns of lens configuration can be varied in different patterns, and a cost reduction can be achieved by designing a preferable lens configuration, which may require less numbers of lenses.

Further, the first lens unit 21 and the second lens unit 22 of the first image capturing unit A, and the third lens unit 31 and the fourth lens unit 32 of the second image capturing unit B can be arranged in a given order. For example, the first lens unit 21, the second lens unit 22, the third lens unit 31, and the fourth lens unit 32 are arranged in this order as illustrated in FIG. 1.

The reflection face 26a of the prism 26 in the first image capturing unit A and the reflection face 36a of the prism 36 in the second image capturing unit B may be used to generate a stereo image for long-range. The face direction of the reflection face 26a of the prism 26 and the face direction of the reflection face 36a of the prism 36 may be set to a same direction.

Further, the face direction of the beam splitter face 27a of the light beam splitter 27 in the first image capturing unit A and the face direction of the beam splitter face 37a of the light beam splitter 37 in the second image capturing unit B may be set to a same direction. Then, the face direction of the reflection faces 26a and 36a of the prisms 26 and 36 and the beam splitter faces 27a and 37a of the light beam splitters 27 and 37 may be set to a same direction.

As such, the face direction of the reflection faces 26a and 36a of the prisms 26 and 36 and the beam splitter faces 27a and 37a of the light beam splitters 27 and 37 may be set to a same direction. With such arrangement, the stereo camera apparatus 1 can employ an optical system, which can reduce an effect caused by reflection characteristic change at the reflection faces 26a and 36a and the beam splitter faces 27a and 37a because light can enter each of the faces from a similar direction and angle.

If each of the faces are not disposed in parallel, the reflected light intensity between the reflection face of the prisms 26 and the reflection face of the 36, and/or light intensity between the beam splitter face of the light beam splitters 27 and the beam splitter face of 37 may become different due to reflection characteristic change at each of the faces, by which brightness imbalance may occur between a stereo image at right side and a stereo image at left side for one same object. Accordingly, by reducing the effect of brightness distribution imbalance caused by reflection characteristic change at the reflection faces 26a and 36a and the beam splitter faces 27a and 37a, a stereo image having a good quality can be generated, and the effect to distance measurement precision can be reduced.

Further, the first light synthesis unit 23 of the first image capturing unit A may include the prism 26 and the light beam splitter 27 as one integrated construction or one integrated unit while opposing the reflection face 26a of the prism 26 and the beam splitter face 27a of the light beam splitter 27 in a parallel direction. Further, the second light synthesis unit 33 of the second image capturing unit B may include the prism 36 and the light beam splitter 37 as one integrated construction or one integrated unit while opposing the reflection face 36a of the prism 36 and the beam splitter face 37a of the light beam splitter 37 in a parallel direction. With such a configuration, even if the prism and light beam splitter may rotate for some angle or shift its position for some length when used in an actual environment for over time, light used for object detection can be captured reliably because the integrated prism and light beam can move at a same angle or length.

A description is now given to the area-divided filter 24 (34) with reference to FIG. 2, which illustrates a perspective view of the first area-divided filter 24 (34). Because the first area-divided filter 24 and the second area-divided filter 34 have a similar configuration, a configuration of the first area-divided filter 24 may be mainly described hereinafter. As illustrated in FIG. 2, the first area-divided filter 24 may include a polarizer area 24a and a polarizer area 24b divided by a dividing line 24c. The polarizer area 24a is aligned with the first lens unit 21 of the first image capturing unit A used for long range. The polarizer area 24b is aligned with the second lens unit 22 of the first image capturing unit A used for short range. Similarly, the second area-divided filter 34 may include a polarizer area 34a and a polarizer area 34b divided by a dividing line 34c. The polarizer area 34a is aligned with the third lens unit 31 of the second image capturing unit B used for long range. The polarizer area 34b is aligned with the fourth lens unit 32 of the second image capturing unit B used for short range.

As such, the first area-divided filter 24 may include the polarizer area 24a, which passes only the S-polarized light component coming from the first lens unit 21 of the first image capturing unit A, and the polarizer area 24b, which passes only the P-polarized light component coming from the second lens unit 22 of the first image capturing unit A. Similarly, the second area-divided filter 34 may include the polarizer area 34a which passes only the S-polarized light component coming from the third lens unit 31 of the second image capturing unit B, and the polarizer area 34b, which passes only the P-polarized light component coming from the fourth lens unit 32 of the second image capturing unit B.

The dividing line 24c (34c) of the first area-divided filter 24 (34) divides the polarizer area 24a (34a) and polarizer area 24b (34b). The dividing line 24c (34c) may extend in a direction, which is parallel to a direction of arrangement of the first lens unit 21 to the fourth lens unit 32. As shown in FIG. 2, the dividing line 24c (34c) of the first area-divided filter 24 (34) divides the polarizer area 24a (34a) and polarizer area 24b (34b) in the X-axis direction, wherein the four lens unit (from first lens unit 21 to fourth lens unit 32) are also arranged in the X-axis direction. With such a configuration, a parallax detection area for images taken by the first lens unit 21 to the fourth lens unit 32 can be set broader.

Typically, the image capturing element 25 (35) includes an image capturing area shaped in rectangular shape. Because the first image capturing element 25 and the second image capturing element 35 have a similar configuration, a configuration of the first image capturing element 25 may be mainly described hereinafter. For example, the first image capturing element 25 (35) may include an image capturing area 25a (35a) and an image capturing area 25b (35b), wherein the image capturing area 25a (35a) and the image capturing area 25b (35b) may be aligned to the polarizer area 24a (34a) and the polarizer area 24b (34b) respectively. As shown in FIG. 2, the dividing line 24c (34c) of the first area-divided filter 24 (34) divides the polarizer area 24a (34a) and polarizer area 24b (34b) in the X-axis direction, and the image capturing area 25a (35a) and the image capturing area 25b (35b) are aligned to the polarizer area 24a (34a) and the polarizer area 24b (34b) respectively. With such a configuration, images taken by the first lens unit 21 to the fourth lens unit 32 can be detected with a broader parallax detection area. It should be noted that the image capturing area 25a (35a) and the image capturing area 25b (35b) are composed of same elements such as charge coupled device (CCD). In example embodiments, the image capturing area 25a (35a) and the image capturing area 25b (35b) are designated as areas for detecting different polarized light components.

Figure 3A:
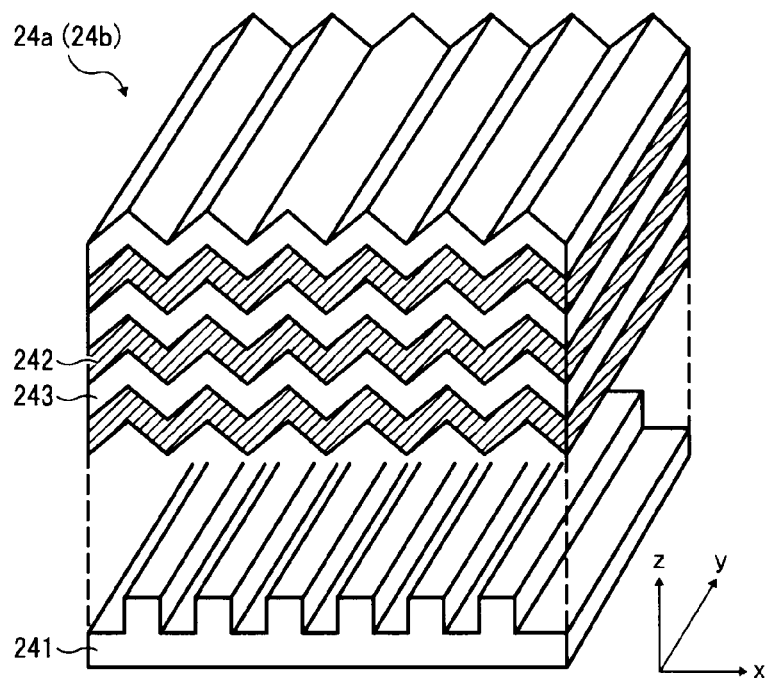
FIG. 3A illustrates a perspective view of a polarizer used for the area-divided filter.

The polarizer area 24a (34a) and the polarizer area 24b (34b) of the first area-divided filter 24 (34) may be a polarizer made of photonic crystal, for example. Because the first area-divided filter 24 and the second area-divided filter 34 have a similar configuration, a configuration of the first area-divided filter 24 may be mainly described hereinafter. As illustrated in FIG. 3A, the polarizer area 24a (or 24b) of the first area-divided filter 24 includes a translucent substrate 241, a high-refractive-index medium layer 242 (as translucent layer), and a low-refractive-index medium layer 243 (as translucent layer), for example. The translucent substrate 241 may be formed with grooves thereon with a given pitch (or periodical interval), and the high-refractive-index medium layer 242 and the low-refractive-index medium layer 243 may be stacked on the translucent substrate 241 alternately while maintaining boundary face shape of the high-refractive-index medium layer 242 and the low-refractive-index medium layer 243.

For example, the high-refractive-index medium layer 242 and the low-refractive-index medium layer 243 have a periodical structure in x-direction, perpendicular to a direction of the grooves of the translucent substrate 241, and have a uniformly formed portion in y-direction, parallel to a direction of the grooves of the translucent substrate 241. Further, the high-refractive-index medium layer 242 and the low-refractive-index medium layer 243 may have another periodical structure, which has a periodical pattern having a pitch greater than a pitch of the grooves of the translucent substrate 241 in x-direction, or the high-refractive-index medium layer 242 and the low-refractive-index medium layer 243 may have non-periodical structure in x-direction. Such photonic crystal having a microscopic periodical structure can be made with higher productivity and higher uniform shape among finished photonic crystal products using an auto-cloning technology for photonic crystals.

The polarizer areas 24a and 24b, made of photonic crystal, can be defined in an orthogonal coordinate system using X, Y, Z directions, perpendicular to each other, as illustrated in FIG. 2, when the polarizer areas 24a and 24b are placed at a X-Y plane. In such condition, light axes 5a and 5b may be set parallel to the Z-direction. In such a configuration, the translucent substrate 241 may be set parallel to a X-Y plane, and then two or more translucent materials are stacked alternately on the translucent substrate 241 in the Z-direction to form a multi-layered structure. For example, such multi-layered structure may be formed of $Ta_2O_5$ and $SiO_2$ stacked alternately in the Z-direction. Such polarizer areas 24a and 24b may include such two or more layers having convex and concaved portions, which are periodically set in the XY plane direction.

Figure 3B:
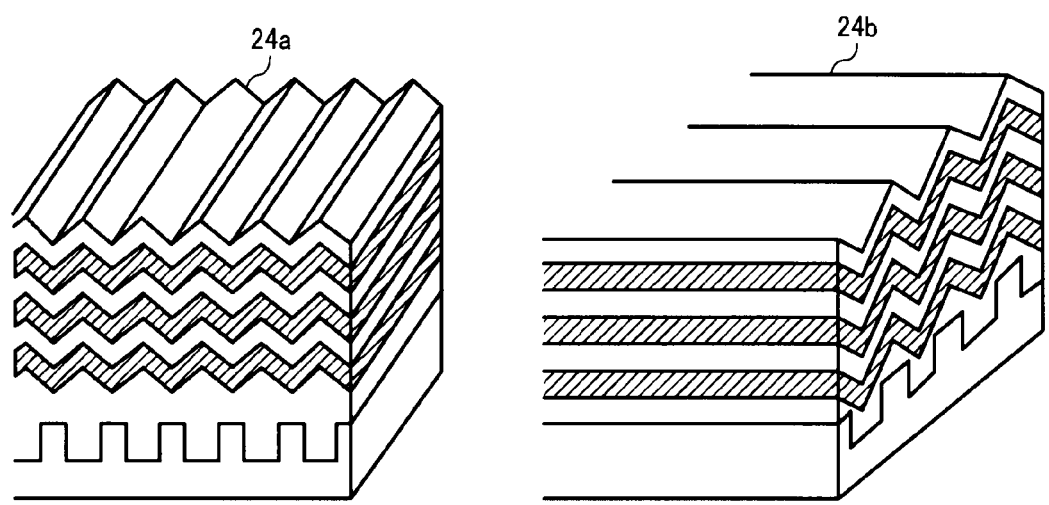
FIG. 3B illustrates a perspective view of two polarizers included in the area-divided filter.

FIG. 3B illustrates each of the polarizer area 24a and the polarizer area 24b. As illustrated in FIG. 3B, the polarizer area 24a has grooves extending in the Y-axis direction (i.e., parallel to Y-direction), and the polarizer area 24b has grooves extending in the X-direction (i.e., parallel to X-direction). As such, the groove direction of the polarizer area 24a and the groove direction of the polarizer area 24b may be set in different directions for 90 degrees. With such a configuration, an incoming light directing to the X-Y plane enters the polarizer area 24a and the polarizer area 24b, by which polarization components having different polarization direction can be separately passed through the X-Y plane, because the polarizer area 24a and the polarizer area 24b can pass through different polarization components.

In example embodiments, the first area-divided filter 24 uses two types of convexed and concaved portions, but the number of types of convexed and concaved portions can be set other values. Such polarizer areas 24a and 24b, made of photonic crystal, may have property of anti-ultraviolet-induced deterioration, by which the polarizer areas 24a and 24b can be used for a long period of time reliably. The polarizer areas 34a and 34b of the second area-divided filter 34 can be made similarly.

An opening area and light-passing direction of the polarizer area 24a (34a) and the polarizer area 24b (34b) of the first area-divided filter 24 (34) can be designed according a size and direction of groove pattern processed on the translucent substrate 241 (341). A pattern formation can be conducted by using known method such as electron beam lithography, photolithography, interference-exposure system, nano-printing, or the like, in which the direction of grooves can be set with a higher precision for each of tiny areas. Accordingly, for example, one polarizer area can be prepared by integrating a plurality of tiny polarizer areas, wherein the tiny polarizer may have different light passing-through direction. Further, as above described, an area having convex and concaved patterns can be used as a polarizer. When the convex and concaved patterns are formed as isotropic patterns in the plane or the surrounding area of the specific area is prepared as flat, light can pass the polarizer without polarization dependent loss. Accordingly, a polarizer can be prepared at a specific area.

Further, the area-divided filters 24 and 34 may be tightly attached to the image capturing elements 25 and 35, respectively. Preferably, the image capturing element 25 (35) may be fixed on a base member, and then a filter face of the first area-divided filter 24 (34) is tightly attached to the image capturing element 25 (35) while setting the filter face of the first area-divided filter 24 (34) to the image capturing element 25 (35). The first area-divided filter 24 (34) may be attached to the image capturing element 25 (35) using adhesives or the like, for example. In general, light coming from a lens is a converging light and such converging light enters an image capturing element. If a distance between the first area-divided filter 24 (34) and the image capturing element 25 (35) becomes longer, a cross talk noise may occur to the image capturing element 25 (35) at an area dividing boundary of the first area-divided filter 24 (34). Such cross talk noise may be suppressed by tightly attaching the first area-divided filter 24 (34) to the image capturing element 25 (35), by which the stereo camera apparatus 1 having less cross talk noise can be devised reliably.

Figure 4:
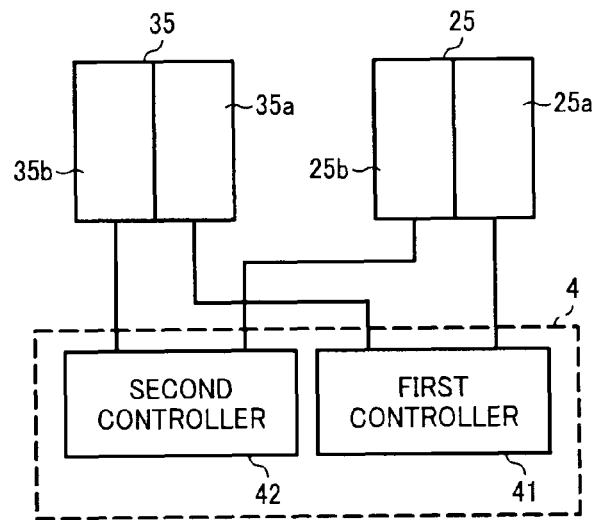
FIG. 4 illustrates an example block diagram of plurality of image capturing elements and a control unit.

The control unit 4 may include a first controller 41 and the second controller 42 as illustrated in FIG. 4 as a block diagram of the stereo camera apparatus 1.

The first controller 41 may receive image data for long range obtained by the image capturing area 25a of the first image capturing element 25, and image data for long range obtained by the image capturing area 35a of the second image capturing element 35, and then synthesize the image data obtained by the image capturing area 25a and the image data obtained by the image capturing area 35a, and then output the synthesized image data.

The second controller 42 may receive image data for short range obtained by the image capturing area 25b of the first image capturing element 25, and image data for short range obtained by the image capturing area 35b of the second image capturing element 35, and then synthesize the image data obtained by the image capturing area 25b and the image data obtained by the image capturing area 35b, and then output the synthesized image data.

Figure 5:
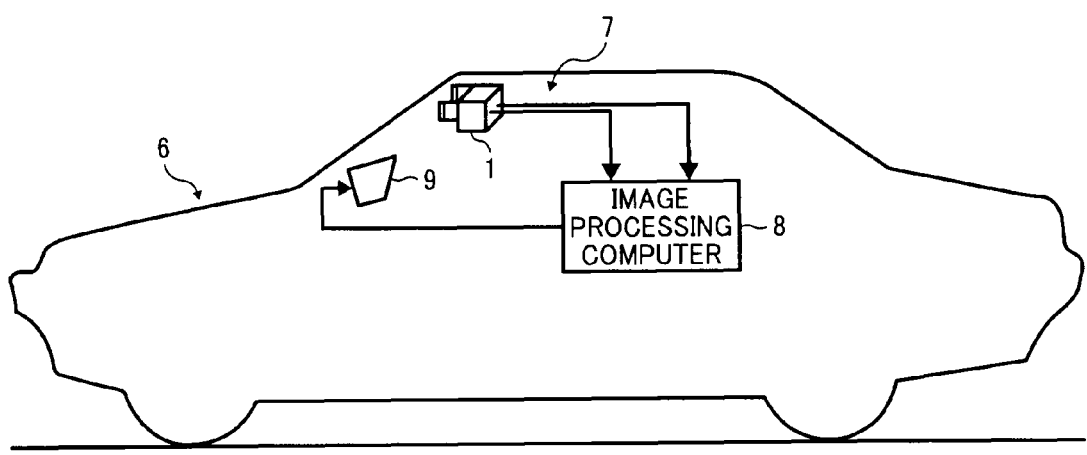
FIG. 5 illustrates a vehicle-mountable monitoring apparatus mounted in a vehicle.

For example, the stereo camera apparatus 1 can be used as a vehicle-mountable monitoring apparatus 7 mountable in a vehicle 6. The vehicle 6 may be automobile as illustrated in FIG. 5, for example, but not limited thereto. The vehicle-mountable monitoring apparatus 7 may be used to take images of objects outside the vehicle 6 within a given range from the vehicle 6 to monitor the vehicle-outside objects. The vehicle-mountable monitoring apparatus 7 may include the stereo camera apparatus 1, an image processing computer 8, and a display unit 9, for example. The stereo camera apparatus 1 may be disposed at a position that the field of view of driver is not blocked by the stereo camera apparatus 1. For example, the stereo camera apparatus 1 may be disposed on a casing of a rear-view mirror of the vehicle 6, but not limited thereto, but can be disposed at any position of the vehicle 6 depending on purpose of the stereo camera apparatus 1. The display unit 9 such as a liquid crystal display (LCD) may be disposed in front of a driver seat, for example. The image processing computer 8 processes image data captured by the stereo camera apparatus 1 to compute distance distribution information in three-dimensional world, and detects road condition such as for example road surface condition, three-dimensional positions of a plurality of three-dimensional objects using the computed distance distribution information at a high computing speed. Based on the detection result, the image processing computer 8 identifies objects outside the vehicle 6 such as forward-traveling vehicles and/or forward-obstruction objects, and determines an activation of warning such as collision warning. For example, if it is determined that the detected object becomes obstructions of the vehicle 6, the image processing computer 8 instructs the display unit 9 to display a "warning" sign to alert such situation to a driver, and activate an automatic collision-avoiding control of the vehicle 6 by controlling relevant units such as actuators.

Figure 6:
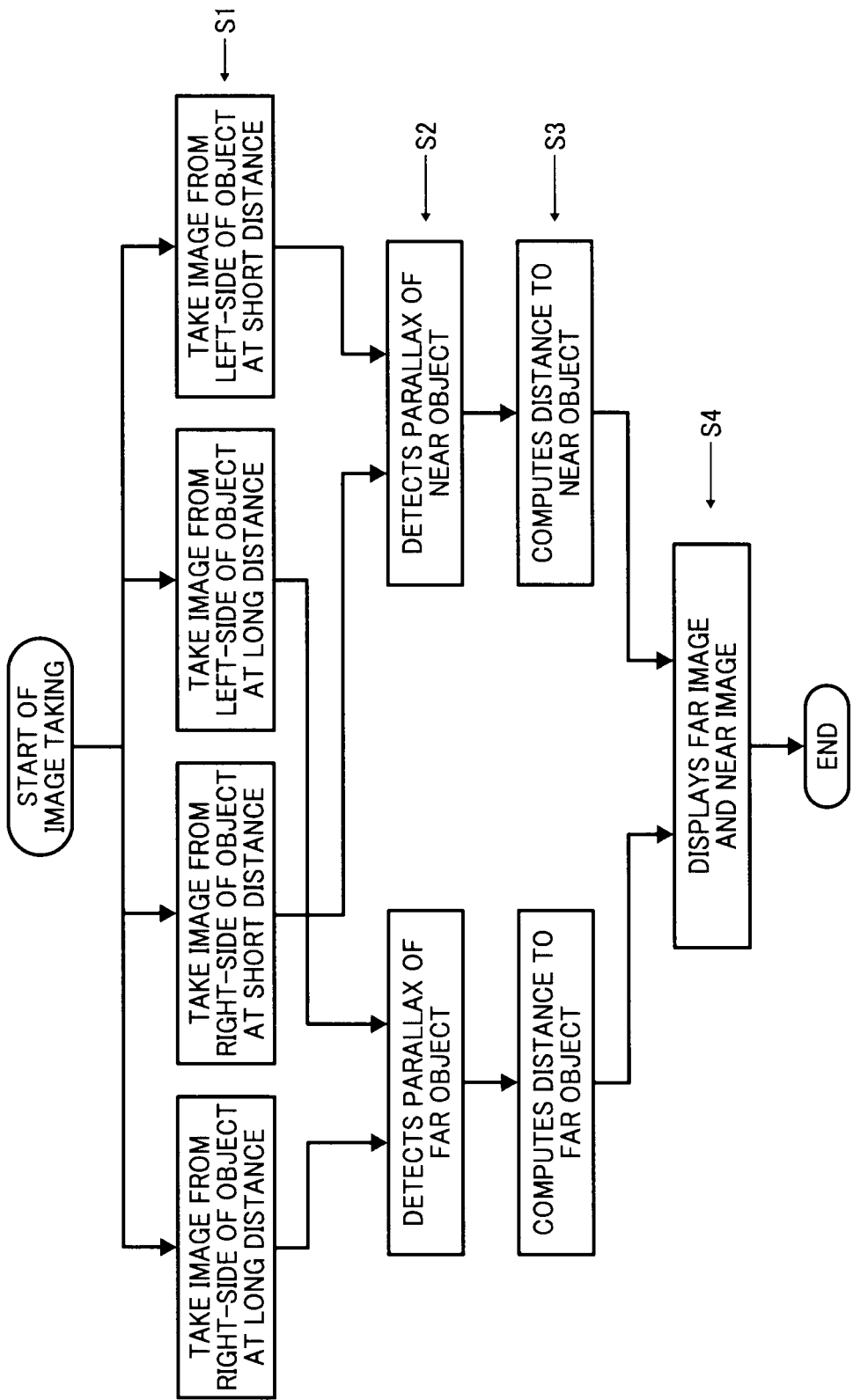
FIG. 6 illustrates a flow chart of processes for measuring a distance to object using the vehicle-mountable monitoring apparatus.

A description is now given to a process of distance measurement using the vehicle-mountable monitoring apparatus 7 mountable in the vehicle 6 with reference to FIG. 6. FIG. 6 illustrates a flow chart of process of such distance measurement. The vehicle-mountable monitoring apparatus 7 may use the stereo camera apparatus 1 to capture image of object, and measure a distance to the object.

When the stereo camera apparatus 1 is activated to capture images of objects in front of the vehicle 6, light enters the first lens unit 21 of the first image capturing unit A, and then reflects at the reflection face 26a of the prism 26 and reflects at the beam splitter face 27a of the light beam splitter 27. Then, only the S-polarized light component of the light passes through the polarizer area 24a of the first area-divided filter 24, and enters the image capturing area 25a of the first image capturing element 25. Further, when the stereo camera apparatus 1 is activated to capture images of objects in front of the vehicle 6, light enters the second lens unit 22, and then passes through the beam splitter face 27a. Then, only the P-polarized light component passes through the polarizer area 24b of the first area-divided filter 24, and enters the image capturing area 25b of the first image capturing element 25.

Further, when the stereo camera apparatus 1 is activated to capture images of objects in front of the vehicle 6, light enters the third lens unit 31 of the second image capturing unit B, and then reflects at the reflection face 36a of the prism 36 and reflects at the beam splitter face 37a of the light beam splitter 37. Then, only the S-polarized light component of the light passes through the polarizer area 34a of the second area-divided filter 34, and enters the image capturing area 35a of the second image capturing element 35. Further, when the stereo camera apparatus 1 is activated to capture images of objects in front of the vehicle 6, light enters the fourth lens unit 32, and then passes through the beam splitter face 37a. Then, only the P-polarized light component passes through the polarizer area 34b of the second area-divided filter 34, and enters the image capturing area 35b of the second image capturing element 35.

With such light receiving process, an image taken from right-side of object at a long range or distance, an image taken from right-side of object at a short range or distance, an image taken from left-side of object at a long range or distance, and an image taken from left-side of object at a short range or distance can be captured by the image capturing elements 25 and 35 (step S1).

The image taken from a right-side of far object captured by the image capturing area 25a of the first image capturing element 25 and the image taken from a left-side of far object captured by the image capturing area 35a of the second image capturing element 35 can be synthesized as "one image" by the first controller 41, and then the synthesized one image is output to the image processing computer 8.

Further, the image taken from a right-side of near object captured by the image capturing area 25b of the first image capturing element 25 and the image taken from a left-side of near object captured by the image capturing area 35b of the second image capturing element 35 can be synthesized as "one image" by the second controller 42, and then the synthesized one image is output to the image processing computer 8.

The image processing computer 8 can detect "parallax" of the far object using the images taken from the right-side and left-side of far object, and the image processing computer 8 can detect "parallax" of the near object using the images taken from the right-side and left-side of near object (step S2).

The image processing computer 8 can compute a distance to the far object by inputting the detected "parallax" of the far object in the formula (1), to be described later, as a far distance measurement result, and computes a distance to the near object by inputting the detected "parallax" of the near object in the formula (1) as a near distance measurement result (step S3). The image processing computer 8 can instruct the display unit 9 to display a far object image and a near object image based on the computed far distance measurement result and near distance measurement result (step S4).

Figure 7A:
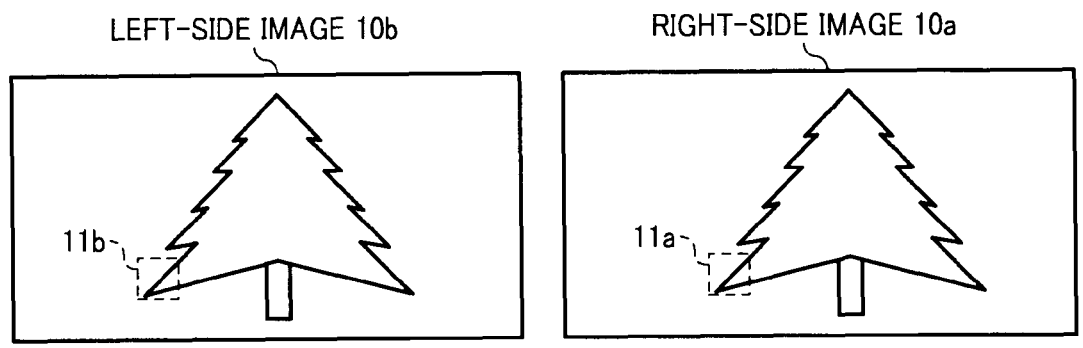
FIG. 7A illustrates a right-side image and a left-side image of object, captured by the processes of FIG. 6.

FIG. 7A illustrates a right-side image 10a and a left-side image 10b of the far object, captured by the above-described process. The image taken from the right-side may be referred to as the right-side image 10a, and the image taken from the left-side may be referred to as the left-side image 10b.

Figure 7B:
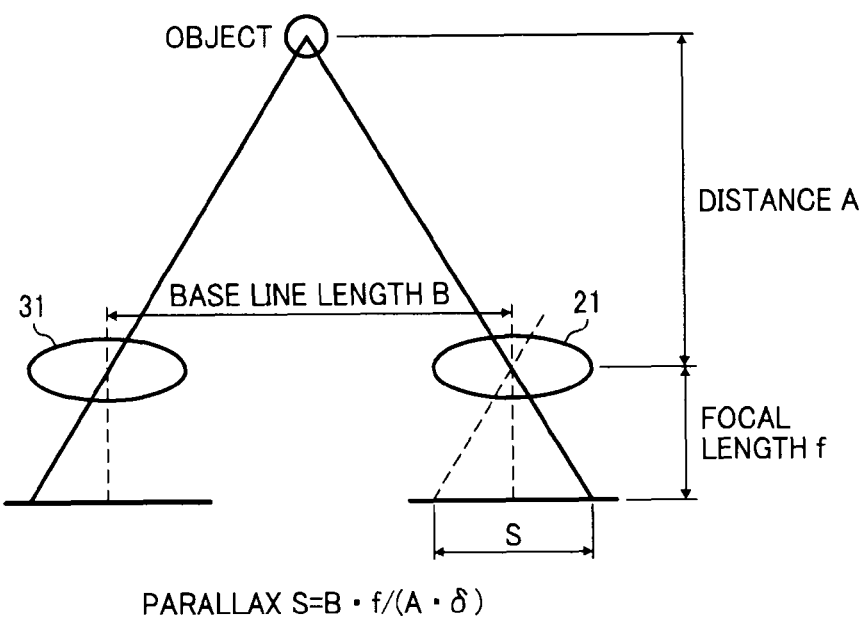
FIG. 7B illustrates a schematic configuration for computing parallax of object, captured by the processes of FIG. 6.

The image processing computer 8 can retrieve an effective area from the right-side image 10a and the left-side image 10b captured by the stereo camera apparatus 1 to compute a parallax S of the right-side image 10a and the left-side image 10b. Specifically, a micro effective area 11a is set in the right-side image 10a and a micro effective area 11b is set in the left-side image 10b, wherein such micro effective areas 11a and 11b are mutually corresponding images. The image processing computer 8 computes the parallax S of object using the micro effective areas 11a and 11b. In example embodiments, objects may be monitored in a horizontal direction, by which such parallax S may occur in a horizontal direction, and the parallax S in the horizontal direction can be computed. The parallax S can be computed with a size of element size of picture such as pixel. As illustrated in FIG. 7B, an object is distanced from the stereo camera apparatus 1 for a distance A, in which the first lens unit 21 of the first image capturing unit A and the third lens unit 31 of the second image capturing unit B is spaced apart setting a baseline length B therebetween, and the first lens unit 21 and the third lens unit 31 have a focal length f. In such a configuration, the following formula (1) can be established for the parallax S, in which delta "$\delta$" is a pixel size of the image capturing element 25 (35).

$$S = B \cdot f / A \cdot \delta \quad (1)$$

The focal length f of first and second lens units 21 and 31, the baseline length B, and the pixel size $\delta$ are known when a given apparatus is selected. Accordingly, the distance A to the object can be computed by computing the parallax S based on the right-side image 10a and the left-side image 10b.

As such, when a distance to a given object is computed, the right-side image 10a captured by the first image capturing element 25 of the first image capturing unit A and the left-side image 10b captured by the second image capturing element 35 of the second image capturing unit B are used, wherein the first image capturing unit A and the second image capturing unit B are mutually independent units, and thereby a relative position of the first image capturing unit A and the second image capturing unit B can be adjusted at preferable level. Accordingly, the baseline length B, set between the first lens unit 21 of the first image capturing unit A and the third lens unit 31 of the second image capturing unit B, can be adjusted by setting a given interval for the first image capturing unit A and the second image capturing unit B, which is matched to design specification of apparatus. For example, the first image capturing unit A and the second image capturing unit B can be arranged at desired positions in the stereo camera apparatus 1 in view of a required performance level of distance measurement.

However, if the distance A to object becomes substantially "infinite," the parallax S becomes substantially zero (0), in which it may become impossible to detect a distance to object correctly, which means, a given value or more needs to be set for the parallax S to detect a distance to object correctly. For example, the distance detection for object needs at least one-fourth of pixel to conduct a distance measurement accurately.

The baseline length B, set between the first lens unit 21 and the third lens unit 31, can be expressed by the following formula (2), which can be derived from the formula (1).

$$B = S \cdot (A \cdot \delta)/f \qquad (2)$$

For example, the focal length f1 of the first lens unit 21 and the third lens unit 31 used for long-range detection is set to 15 mm, the focal length f2 of the second lens unit 22 and the fourth lens unit 32 used for short-range detection is set to 5 mm, a measurement range for far distances is set to up to 100 m, and a measurement range for near distances is set to 5 to 20 m.

When a wide-angle lens having a shorter focal length is used, the baseline length B needs to be set greater to ensure a satisfactory level of parallax S. Conversely, when a narrow-angle lens having a longer focal length is used, the baseline length B can be set smaller to ensure a satisfactory level of parallax S.

In general, the smaller the baseline length B, the smaller the size of the stereo camera apparatus 1. Therefore, if the size of the stereo camera apparatus 1 is to be reduced, the baseline length B may be reduced, in which a narrow-angle lens having a longer focal length can be used effectively.

If a wide-angle view is taken, the focal length f decreases and the baseline length B increases. However, if the to-be-measured distance A is set to a relatively shorter range, the baseline length B can be set smaller as well as indicated by the formula (2), enabling the stereo camera apparatus 1 to be made more compact.

In view of such relation between baseline length and lens type, a configuration of FIG. 1 can be devised. As illustrated in FIG. 1, the second lens unit 22 used for short range is disposed between the first lens unit 21 and the third lens unit 31 used for long range, and the fourth lens unit 32 used for short range is disposed outside of the third lens unit 31 used for long range. With such a configuration, a baseline length B for long range and a baseline length B for short range can be set to a substantially similar length, and the baseline length B between the second lens unit 22 and the fourth lens unit 32 for short range may not become too small. For example, an image of near object existing in front of the vehicle 6 for about a distance of 5 m to 20 m can be captured using a wide angle lens to compute a distance to the object.

FIG. 8 illustrates an arrangement configuration of the lens units 21, 22, 31, and 32 in the stereo camera apparatus 1. FIG. 8(a) illustrates a conventional arrangement configuration of lens units for long range and short range in a stereo camera apparatus, wherein such a pattern is described in JP-H11-39596-A, for example. FIG. 8(b) illustrates an arrangement configuration of lens units for long-range and short range in the stereo camera apparatus 1 of FIG. 1. In FIG. 8(a), the second lens unit 22 and the fourth lens unit 32 for short range are disposed between the first lens unit 21 and the third lens unit 31 for long range. On the other hand, in FIG. 8(b), the second lens unit 22 for short range is disposed between the first lens unit 21 and the third lens unit 31 for long range, and the fourth lens unit 32 for short range is disposed outside the third lens unit 31 for long range. FIGS. 8(a) and 8(b) show a schematic arrangement view of lens units for long range and lens units for short range by schematically contacting the lens units for long-range and the lens units for short range.

The first lens unit 21 and the third lens unit 31 for long range may have a lens diameter La, and the second lens unit 22 and the fourth lens unit 32 for short range may have a lens diameter Lb as shown in FIG. 8. In FIG. 8(a), the second lens unit 22 and the fourth lens unit 32 for short range have a baseline length Bw1, and the first lens unit 21 and the third lens unit 31 for long range have a baseline length Bt1. In FIG. 8(b), the second lens unit 22 and the fourth lens unit 32 for short range have a baseline length Bw2, and the first lens unit 21 and the third lens unit 31 for long range have a baseline length Bt2. Such baseline length can be expressed by the following formulas (3) to (6).

$$Bw1 = Bt1 - (La + Lb) \qquad (3)$$

$$Bt1 = Bw1 + (La + Lb)/2 \qquad (4)$$

$$Bw2 = Bt2 \qquad (5)$$

$$Bt2 = Bw1 + (La + Lb)/2 \qquad (6)$$

As indicated by the formulas (4) and (6), the baseline length Bw2 (see FIG. 8(b)) set for the second lens unit 22 and the fourth lens unit 32 used for short range can be set greater than the baseline length Bw1 (see FIG. 8(a)) set for the second lens unit 22 and the fourth lens unit 32 used for short range.

Accordingly, the arrangement pattern of FIG. 8(b) is preferable for taking object image with a wider angle view. If an object image can be captured with a wider angle view, an image of object near the vehicle 6 can be captured more effectively. For example, if an object image can be captured with a wider angle view, an object near the vehicle 6 can be detected more effectively, by which vehicle accident can be evaded more effectively. For example, sudden emergence of object from a blind area of vehicle can be detected more effectively.

Further, the beam splitter face 27a of the light beam splitter 27 disposed in the first light synthesis unit 23 of the first image capturing unit A has different polarization separation performance depending on incident light angle against the beam splitter face 27a. Similarly, the beam splitter face 37a of the light beam splitter 37 disposed in the second light synthesis unit 33 of the second image capturing unit B has different polarization separation performance depending on incident light angle against the beam splitter face 37a.

As illustrated in FIG. 8(b), in the stereo camera apparatus 1, the second lens unit 22 for short range is disposed between the first lens unit 21 and the third lens unit 31 for long range, and the fourth lens unit 32 for short range is disposed outside the third lens unit 31 for long range, and the first light synthesis unit 23 of the first image capturing unit A and the second light synthesis unit 33 of the second image capturing unit B are arranged with an arrangement pattern illustrated in FIG. 9(a).

On the other hand, in the stereo camera apparatus illustrated in FIG. 8(a), the second lens unit 22 and the fourth lens unit 32 for short range are disposed between the first lens unit 21 and the third lens unit 31 for long-range. To such configuration, the first light synthesis unit 23 of the first image capturing unit A and the second light synthesis unit 33 of the second image capturing unit B may be arranged with an arrangement pattern illustrated in FIG. 9(*b*). In a case of arrangement pattern of FIG. 9(*b*), the beam splitter face 27*a* of the light beam splitter 27 in the first light synthesis unit 23, and the beam splitter face 37*a* of the light beam splitter 37 in the second light synthesis unit 33 have different face directions with respect to incident light angle. In such a configuration, light passing ratio of converging light including image information may become different between the beam splitter face 27*a* and the beam splitter face 37*a*, by which two images cannot be compared correctly, and thereby distance measurement performance may deteriorate.

On the other hand, in a case of arrangement pattern of FIG. 9(*a*), light reflection faces in the first light synthesis unit 23 and the second light synthesis unit 33 of the stereo camera apparatus 1 are arranged in a same direction. Accordingly, an incident light angle to the reflection face 26*a* of the prism 26 and an incident light angle to the reflection face 36*a* of the prism 36 can set to a substantially same angle, and an incident light angle to the beam splitter face 27*a* of the light beam splitter 27 in the first light synthesis unit 23 and an incident light angle to the beam splitter face 37*a* of the light beam splitter 37 in the second light synthesis unit 33 can set to a substantially same angle, and thereby distance measurement performance may not deteriorate.

If the first light synthesis unit 23 and the second light synthesis unit 33 are arranged in the stereo camera apparatus 1 as illustrated in FIG. 9(*a*), light follows two light paths, which is termed as first light path and second light path. In case of first light path, a light reflects at the reflection face 26*a* (36*a*) of the prism 26 (36), and then the light reflects at the beam splitter face 27*a* (37*a*) of the light beam splitter 27 (37). In case of second light path, a light enters and passes the beam splitter face 27*a* (37*a*) of the light beam splitter 27 (37). Accordingly, the first light path length becomes greater than the second light path length. In view of such light path length, a distance from a last lens of the first lens unit 21 to the first image capturing element 25 and a distance from a last lens of the third lens unit 31 to the second image capturing element 35 are set greater, and a distance from a last lens of the second lens unit 22 to the first image capturing element 25 and a distance from a last lens of the fourth lens unit 32 to the second image capturing element 35 are set smaller. The last lens of the lens unit (i.e., first, second, third, fourth lens unit) may mean a lens disposed at most close position to the image capturing element. As such, the distance from the last lens of the first lens unit 21 and the third lens unit 31 for long range to the image capturing element are set greater, by which lens configuration design can be varied easily.

When a lens configuration is designed, the first lens unit 21 and the third lens unit 31, and the second lens unit 22 and the fourth lens unit 32 may need to be designed to satisfy several conditions such as focal length, numerical aperture NA, resolution level, aberration, and brightness. Accordingly, a distance from a last lens of lens unit to the image capturing element cannot be set freely, but there is some limit.

Figure 10:
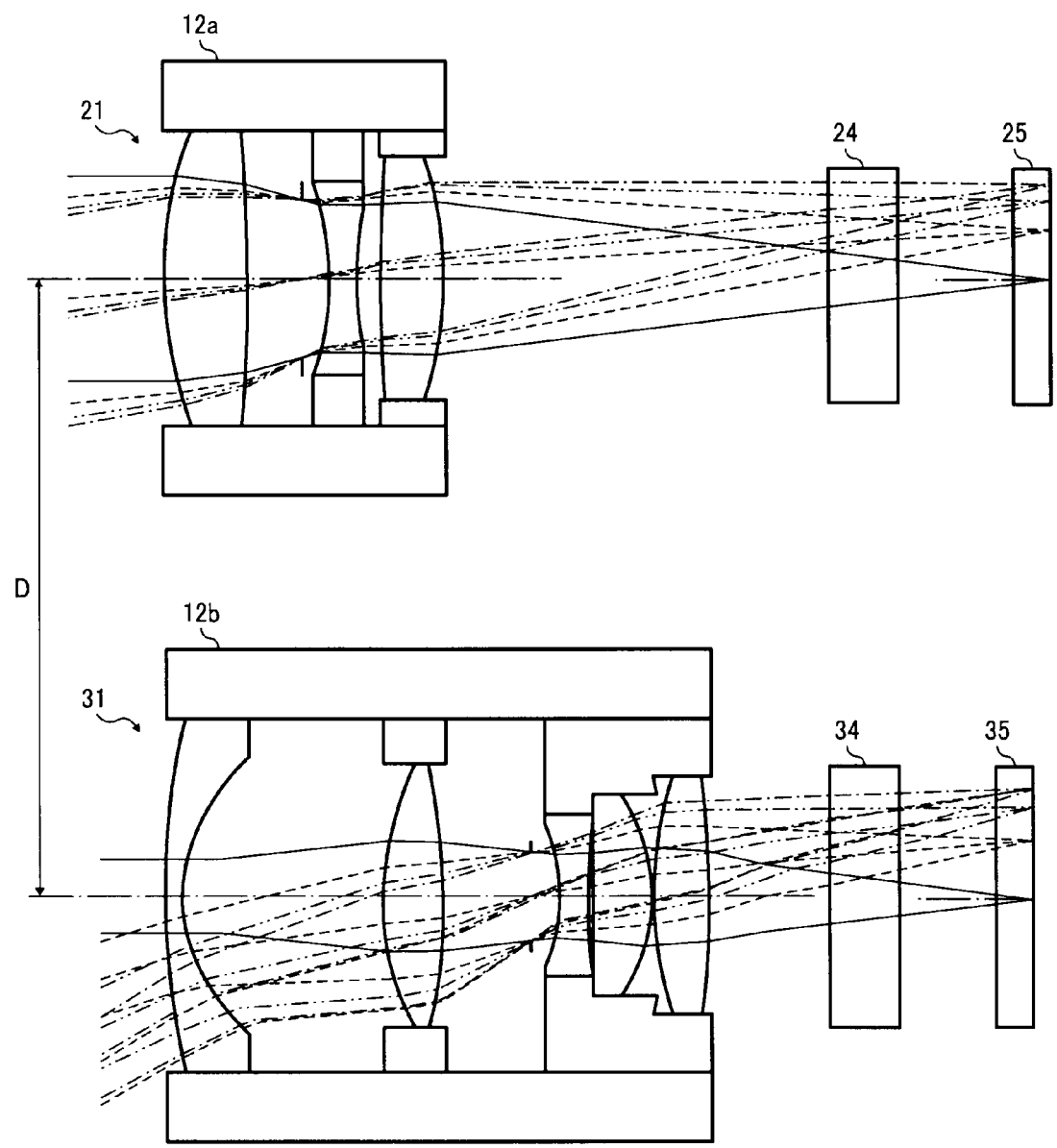
FIG. 10 illustrates an example arrangement pattern for lens unit for long-range and for short range.

Further, an interval between the first lens unit 21 for long range and the second lens unit 22 for short range may need to be set narrower (i.e., close-arrangement pattern), and an interval between the third lens unit 31 for long range and the fourth lens unit 32 for short range may need to be set narrower (i.e., close-arrangement pattern). The first lens unit 21, the second lens unit 22, the third lens unit 31, and the fourth lens unit 32 may be configured with a plurality of single-lenses, and a lens holder may support the single-lenses. For example, as illustrated in FIG. 10, the first lens unit 21 for long range is supported by a lens holder 12*a*, and the second lens unit 22 for short range is supported by a lens holder 12*b*. An interval distance D of the first lens unit 21 and the second lens unit 22 may need to be set smaller to arrange the first lens unit 21 and the second lens unit 22 at a close position (i.e., close-arrangement pattern). A thickness of the lens holders 12*a* and 12*b* may need to be set smaller to achieve such close arrangement. However, there is a required thickness for the lens holders 12*a* and 12*b* because the first lens unit 21 and second lens unit 22 need to be supported and fixed effectively by the lens holders 12*a* and 12*b*. Accordingly, the first lens unit 21 for long-range and the second lens unit 22 for short range may be integrated as one construction or one unit, by which the first lens unit 21 and the second lens unit 22 can be arranged with a close arrangement pattern.

Figure 11A:
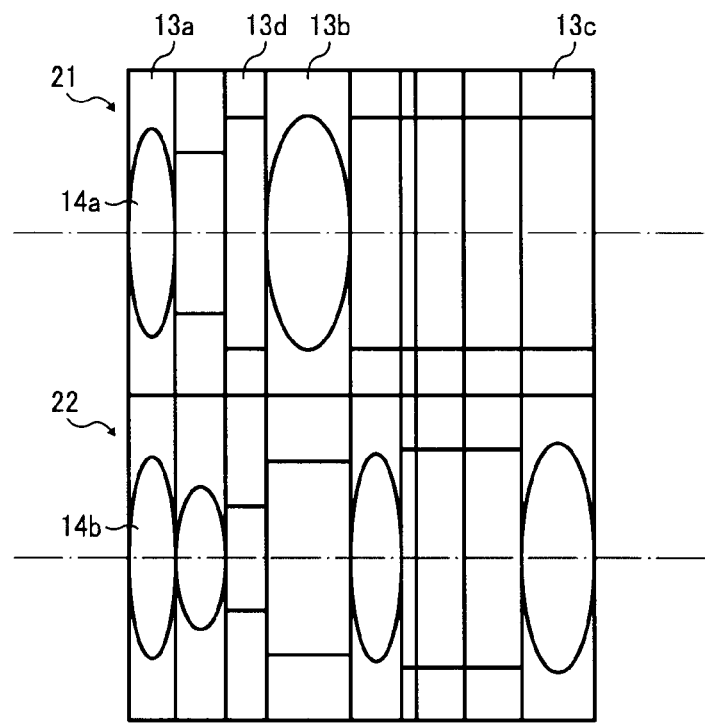
FIG. 11A illustrates a cross-sectional view of integrated lens units for long-range and for short range.
Figure 11B:
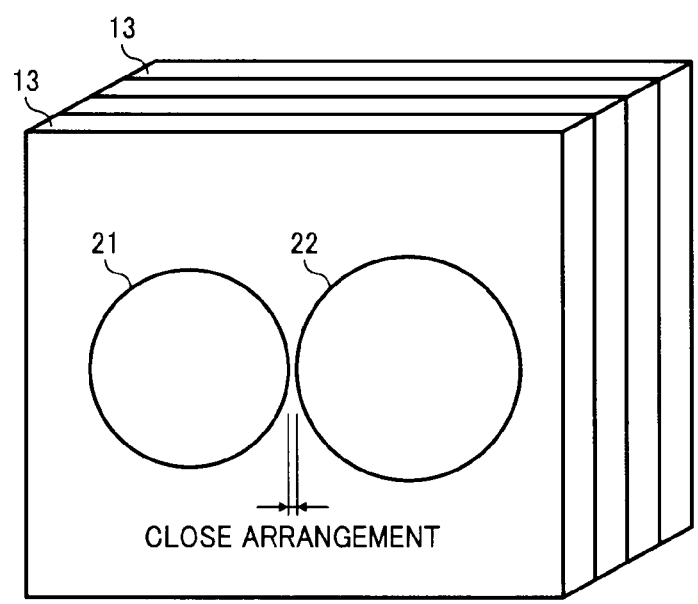
FIG. 11B illustrates a perspective view of the integrated lens units for long-range and for short range.

The first lens unit 21 and second lens unit 22 can be arranged with a close arrangement pattern as illustrated in FIG. 11. FIG. 11A illustrates a cross-sectional view of the first lens unit 21 and second lens unit 22, and FIG. 11B illustrates a perspective view of the first lens unit 21 and second lens unit, which may be prepared as below using following wafers having formed of lenses or the like. For example, a wafer 13*a* including a lens array having single lenses 14*a* and 14*b* is prepared, in which the single lens 14*a* is used as an image taking lens, and the single lens 14*b* is used as an image taking lens; a wafer 13*b* including a single lenses 14*a* and a cavity, a wafer 13*c* including a single lenses 14*b* and a cavity, and a wafer 13*d* including a cavity are prepared. The wafers 13*a*, 13*b*, 13*c*, and 13*d* are stacked each other while aligning the cavities and single lenses. The cavities may have given diameters, which may be smaller or greater than a lens diameter of single lenses used as the image taking lens. Such stacked wafers becomes an integrated structure of the first lens unit 21 for long range and the second lens unit 22 for short range. The first lens unit 21 and second lens unit 22 have different properties such as the number of lenses, lens pitch, lens curvature, for example. Accordingly, each one of wafers 13 may be manufactured differently such as a wafer having a lens, a wafer without a lens, a wafer having a lens of first curvature, a wafer having a lens of second curvature different from the first curvature, for example. Such wafers 13 may be stacked each other to prepare the first lens unit 21 for long range and second lens unit 22 for short range as a close arranged structure. With such a structure, even if the distance from a last lens of the lens unit to the image capturing element may not be so long, the first light synthesis unit 23 can be used to project two images to the first image capturing element 25, and the second light synthesis unit 33 can be used to project two images to the second image capturing element 35.

Figure 12:
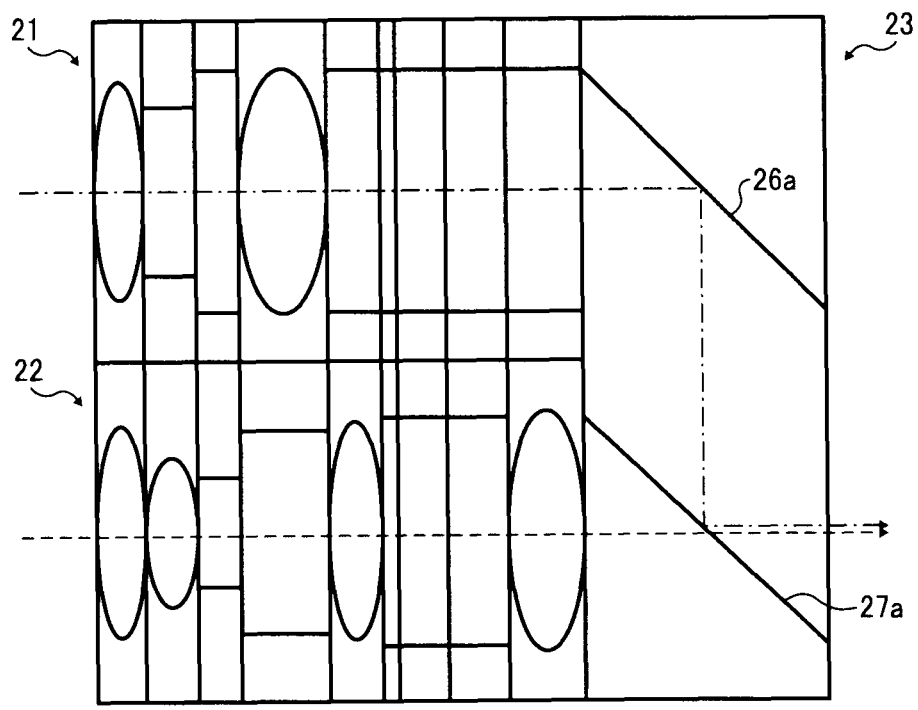
FIG. 12 illustrates a schematic configuration of lens units for long-range and for short range and light synthesis unit integrated as a whole.

Further, FIG. 12 illustrates a cross-sectional view of the first lens unit 21 for long range and second lens unit 22 for short range, and first light synthesis unit 23 stacked on the first lens unit 21 and second lens unit 22. The first lens unit 21 (31) for long range and second lens unit 22 (32) for short range may be prepared as close-arrangement structure by stacking the wafers 13 having lens array and the wafer 13 without lens, and then the first light synthesis unit 23 (33) may be further stacked and integrated. The first light synthesis unit 23 (33) may be prepared by disposing a multi-layered dielectric film or a metallic reflection film between plates, and then cut into a given size. The first light synthesis unit 23 (33) can be stacked and bonded with the wafers 13 composing the first lens unit 21 (31) for long range and second lens unit 22 (32) for short range as one integrated unit, and then such integrated unit is cut into a given size. As such, by integrating the first lens unit 21 (31) for long range and second lens unit 22 (32)

for short range and the first light synthesis unit 23 (33), an optical system having the first image capturing unit A and the second image capturing unit B can be manufactured with compact in size. With such a configuration, even if the first lens unit 21 (31) for long range and second lens unit 22 (32) for short range may rotate for some angle or shift its position for some length when used in an actual environment for over time, light used for object detection can be captured reliably because the integrated first lens unit 21 (31), second lens unit 22 (32), and light synthesis unit 23 (33) can move for a same angle or length, by which and an apparatus having robustness for environment condition change such as temperature change can be devised.

Figure 13:
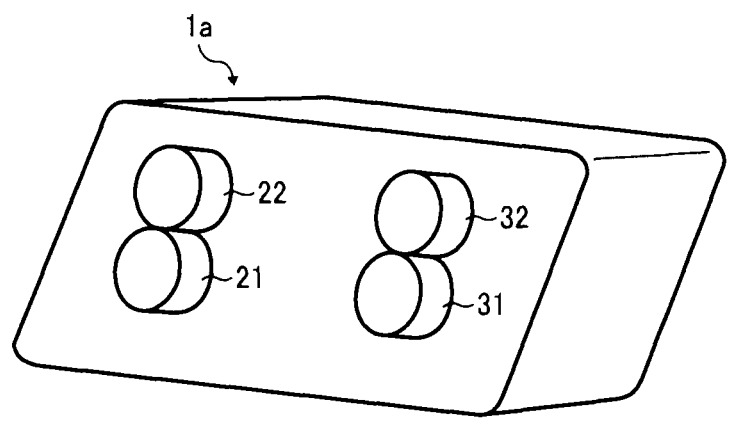
FIG. 13 illustrates a perspective view of another arrangement pattern of lens units for long-range and for short range.

In the above described embodiment, the first lens unit 21 and the second lens unit 22 of the first image capturing unit A, and the third lens unit 31 and the fourth lens unit 32 of the second image capturing unit B are arranged in a horizontal direction. FIG. 13 illustrates a perspective view of another stereo camera apparatus 1a, in which the first lens unit 21 and the third lens unit 31 for long range are arranged under the second lens unit 22 and the fourth lens unit 32 for short range. As such, the lens unit for long range can be arranged under the lens unit for short range (e.g., vertically arrangement), for example.

Figure 14:
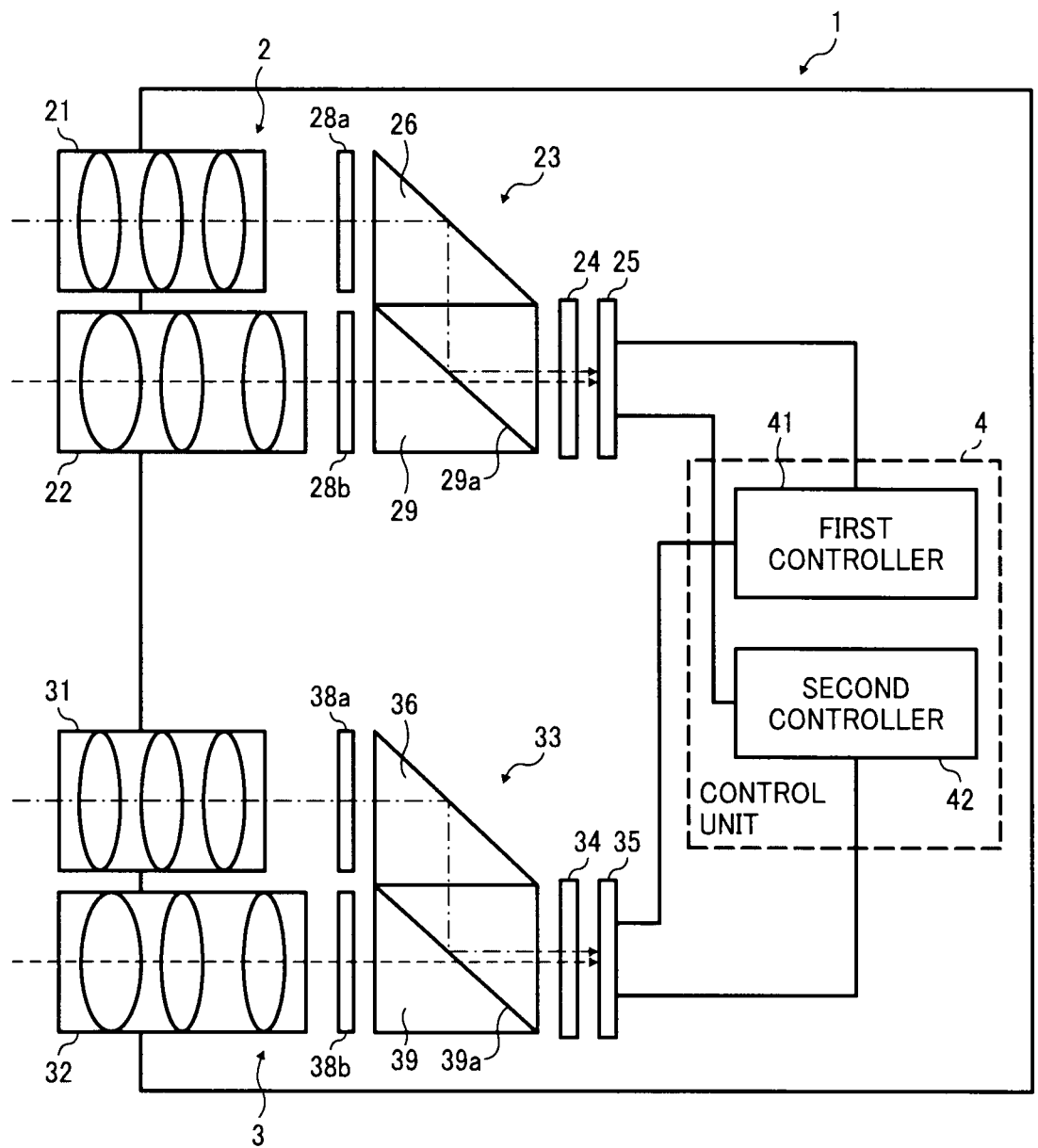
FIG. 14 illustrates a schematic configuration of another stereo camera apparatus according to another example embodiment.

In the above-described embodiment, the S-polarized light component and the P-polarized light component, which enter the area-divided filters 24 and 34, can be separated using the light beam splitters 27 and 37. FIG. 14 illustrates another arrangement for separating the S-polarized light component and the P-polarized light component. As illustrated in FIG. 14, the first lens unit 21 and the third lens unit 31 may be disposed with polarizers 28a and 38a for passing S-polarized light component, and the second lens unit 22 and the fourth lens unit 32 may be disposed with polarizers 28b and 38b for passing P-polarized light component. Further, instead of the light beam splitters 27 and 37, prisms 29 and 39 having a reflection face that can reflect the S-polarized light component and pass through the P-polarized light component may be used.

In the above-described embodiment, the area-divided filters 24 (34) employ photonic crystal. However, a wire-grid polarizer can be also used for the area-divided filters 24 (34). The wire-grid polarizer, prepared by arranging thin metal wires periodical pattern, can be used in extremely high frequency of electro-magnetic wave, for example. In the wire-grid polarizer, thin metal wires, which are thin enough compared to a wave length of incident light, are arranged with an interval, which is small enough compared to the wave length of incident light. When light enters the wire-grid polarizer, a polarization component parallel to the thin metal wires is reflected by the wire-grid polarizer, and another polarization component perpendicular to the thin metal wires passes through the wire-grid polarizer. An extending direction of thin metal wires can be separately set for a plurality areas on one substrate, in which the wire-grid polarizer property can be changed for each of areas. With such a configuration, a light-passing direction of polarization component can be changed for each of areas.

The wire-grid polarizer can be prepared by using known methods such as lithography, in which a metal layer is formed on a substrate, and a patterning process is conducted using lithography to form thin metal wires. Further, a vacuum evaporation method can be used for preparing the wire-grid polarizer. For example, grooves are formed on a substrate using lithography, and then a vacuum evaporation is conducted to the substrate by directing metal particles from a slanted direction over the substrate face (i.e., direction perpendicular to the groove direction and slanted from a vertical direction of substrate) to form a metal layer. Metal particles coming from an evaporation source may not collide with molecules or atoms in vacuumed condition. The metal particles travels in a straight direction from the evaporation source to the substrate, and form a layer on convexed portions of the grooves, but may not form a layer on concaved portions of the grooves (i.e., bottom of grooves) because the convexed portions block the metal particles. Accordingly, by controlling amount of metal particles, a metal film layer can be formed only on the convexed portions of the grooves, by which thin metal wires can be prepared as wire-grid polarizer. The wire-grid polarizer may be made of aluminum, silver, tungsten, or the like, but not limited thereto. Further, the lithography may be photolithography, electron beam lithography, or X-ray lithography. Because the interval of wire-grid polarizer may be set to 100 nm (nano meter) in view of using visible light, the electron beam lithography or X-ray lithography may be preferable. The vacuum evaporation may be preferable for forming a metal layer. Further, a sputtering under higher vacuum condition or a collimation sputtering using collimator can be used as long as metal particles can be directed to a substrate correctly. As similar to a polarizer made of photonic crystal, a dividing line can be formed precisely for the wire-grid polarizer because the wire-grid polarizer can be prepared using a semiconductor process.

As above described, a stereo camera apparatus and a vehicle-mountable monitoring apparatus using the stereo camera apparatus that can precisely measure distance of object from short range to long range can be devised, and the stereo camera apparatus and vehicle-mountable monitoring apparatus can secure a broader field of view using a wide angle lens.

Further, the stereo camera apparatus and vehicle-mountable monitoring apparatus can suppress cost increase while securing broader range field of view from near distance to far distance. Further, the stereo camera apparatus can reduce its size and is mountable in vehicle without causing oppression feeling to driver and/or passenger, by which safety of driver and passenger can be enhanced.

In the above described example embodiments, a stereo camera apparatus includes a first image capturing unit having a first lens unit and a second lens unit, and a second image capturing unit having a third lens unit and a fourth lens unit. In the first image capturing unit, the first lens unit and second lens unit set with a close arrangement configuration while setting light axes of the first lens unit and second lens unit parallel each other. In the second image capturing unit, the third lens unit and fourth lens unit set with a close arrangement configuration while setting light axes of the third lens unit and fourth lens unit parallel each other. Further, the first image capturing unit and the second image capturing unit are spaced apart each other with a given distance. Such four lens units can be used to take images of objects with broader field of view.

Further, image taken by the first lens unit and second lens unit of the first image capturing unit can be detected by one image capturing element, and image taken by the third lens unit and fourth lens unit of the second image capturing unit can be detected by one image capturing element. Accordingly, the number of image capturing elements can be reduced and thereby a cost reduction can be achieved.

Further, a focal length of the first lens unit and a focal length of the third lens unit are set equal, and a focal length of the second lens unit and a focal length of the fourth lens unit are set equal. The focal length set for the first lens unit and the third lens unit are greater than the focal length set for the second lens unit and the fourth lens unit. With such a configuration, a stereo image of far object and a stereo image of near object can be formed, and distance measurement can be conducted for a broader distance range more precisely.

Further, a distance from a last lens of the first lens unit of the first image capturing unit to the first image capturing element and a distance from a last lens of the third lens unit of the second image capturing unit to the second image capturing element are set equal, and a distance from a last lens of the third lens unit of the first image capturing unit to the first image capturing element and a distance from a last lens of the fourth lens unit of the second image capturing unit to the second image capturing element are set equal. The distance from the last lens of the first lens unit to the first image capturing element and the distance from the last lens of the third lens unit to the second image capturing element are greater than the distance from the last lens of the second lens unit to the first image capturing element and the distance from the last lens of the fourth lens unit to the second image capturing element. With such a configuration, a simpler optical system can be devised, in which two lens units and one light synthesis unit are used to capture two images by one image capturing element.

Further, light coming from the first lens unit and third lens unit can be reflected for two times in the light synthesis unit, wherein the distance from a last lens of first lens unit to the first image capturing element and the distance from a last lens of third lens unit to the second image capturing element are set greater. Further, light coming from the second lens unit and third lens unit is not reflected in the light synthesis unit, wherein the distance from a last lens of the second lens unit to the first image capturing element and or the distance from a last lens of the third lens unit to the second image capturing element is set smaller. With such a configuration, the stereo camera can include an optical system, which may not be affected by of brightness distribution change due to reflection characteristic. Two images captured by the first lens unit and third lens unit can be matched correctly, and two images captured by the second lens unit and fourth lens unit can be matched correctly, and thereby distance measurement can be conducted precisely for far distance and near distance.

Further, an arrangement order of the first lens unit and the second lens unit in the first image capturing unit, and the third lens unit and the fourth lens unit in the second image capturing unit are set in an order of the first lens unit, the second lens unit, the third lens unit, and the fourth lens unit. With such a configuration, a baseline length between the first lens unit and third lens unit, and a baseline length between the second lens unit and fourth lens unit can be adjusted to a preferable value, and thereby distance measurement can be conducted precisely.

Further, the first lens unit and the second lens unit can be integrated as one integrated construction or one integrated unit in the first image capturing unit, and the third lens unit, and the fourth lens unit can be integrated as one integrated construction or one integrated unit in the second image capturing unit. With such a configuration, a lens unit for long range and a lens unit for short range can be arranged at close position in the first image capturing unit, and a lens unit for long range and a lens unit for short range can be arranged at close position in the second image capturing unit. Such a configuration can eliminate an adjustment work of position of lens unit for long range and an adjustment work of position of lens unit for short range, which may be conducted independently in a conventional configuration, but the adjustment work of positioning of lens unit for long range and lens unit for short range can be conducted with a simpler operation in example embodiments.

Further, the first light synthesis unit includes a prism and a light beam splitter. The prism includes a reflection face to reflect a light path of light for ninety (90) degrees. The light beam splitter includes a beam splitter face, arranged in parallel to the reflection face of the prism. The beam splitter face can reflect the S-polarized light component, and lets through the P-polarized light component. The prism and the light beam splitter can be integrated as one integrated construction or one integrated unit.

The second light synthesis unit includes a prism and a light beam splitter. The prism includes a reflection face to reflect a light path of light for ninety (90) degrees. The light beam splitter includes a beam splitter face, arranged in parallel to the reflection face of the prism. The beam splitter face can reflect the S-polarized light component, and lets through the P-polarized light component. The prism and the light beam splitter can be integrated as one integrated construction or one integrated unit.

Such first light synthesis unit can be integrated with the first lens unit and the second lens unit in the first image capturing unit, and such second light synthesis unit can be integrated with the third lens unit and the fourth lens unit in the second image capturing. With such a configuration, even if the prism and light beam splitter may rotate for some angle or shift its position for some length when used in an actual environment for over time, light used for object detection can be captured reliably because the integrated prism and light beam can move at a same angle or length.

Further, the above described stereo camera apparatus can be mounted in a vehicle as a vehicle-mountable monitoring apparatus. Such vehicle-mountable monitoring apparatus can capture a stereo image for far object and a stereo image for near object, and distance measurement can be conducted precisely for a broader distance range.

In the above-described exemplary embodiments, a far object is detected by using the S-polarized light component, and a near object is detected by using the P-polarized light component. However, a far object may be detected by using the P-polarized light component, and a near object is detected by using the S-polarized light component by employing any suitable configurations.

In the above-described exemplary embodiments, a computer can be used with a computer-readable program to control functional units used for measuring distance to object, a system for measuring distance to object, an apparatus for measuring distance to object, and a distance measuring method. For example, a particular computer (e.g., personal computer, work station) may control the distance measuring or apparatus using a computer-readable program, which can execute the above-described processes or steps. Further, in the above-described exemplary embodiments, a storage device (or recording medium), which can store computer-readable program, may be a flexible disk, a compact disk read only memory (CD-ROM), a digital versatile disk read only memory (DVD-ROM), DVD recording only/rewritable (DVD-R/RW), a memory card, a memory chip, a mini disk (MD), a magneto optical disc (MO), magnetic tape, hard disk such in a server, or the like, but not limited these. Further, a computer-readable program can be downloaded to a particular computer (e.g., personal computer) via a network such as the Internet, or a computer-readable program can be installed to a particular computer from the above-mentioned storage device, by which the particular computer may be used for the printing processing system or apparatus according to exemplary embodiments, for example.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. A stereo camera apparatus, comprising:
   a first image capturing unit to capture an image of an object;
   a second image capturing unit to capture an image of the object, the second image capturing unit spaced a given distance from the first image capturing unit; and
   a control unit to receive and control processing of data of the image captured by the first image capturing unit and the second image capturing unit,
   the first image capturing unit including:
   a first lens unit;
   a second lens unit, disposed next to the first lens unit;
   a first light synthesis unit disposed after a light exit side of the first lens unit and second lens unit;
   a first area-divided filter disposed after a light exit side of the first light synthesis unit; and
   a first image capturing element disposed immediately after a light exit side of the first area-divided filter,
   the first lens unit set parallel to the second lens unit by setting a light axis of the first lens unit parallel to a light axis of the second lens unit,
   the first light synthesis unit reflecting light coming from the first lens unit 90 degrees, and further reflecting the light 90 degrees to guide a S-polarized light component of the light to the first area-divided filter,
   the first light synthesis unit allowing and guiding a P-polarized light component of the light coming from the second lens unit to the first area-divided filter,
   the first area-divided filter including two polarizer area, one polarizer area letting through the S-polarized light component and another polarizer area letting through the P-polarized light component,
   the first area-divided filter separating the light coming from the first light synthesis unit into the S-polarized light component and the P-polarized light component,
   the first image capturing element receiving the S-polarized light component and the P-polarized light component, separated by the first area-divided filter, to detect a S-polarized light component image and a P-polarized light component image,
   the second image capturing unit including:
   a third lens unit;
   a fourth lens unit, disposed next to the third lens unit;
   a second light synthesis unit disposed after a light exit side of the third lens unit and fourth lens unit;
   a second area-divided filter disposed after a light exit side of the second light synthesis unit; and
   a second image capturing element disposed immediately after a light exit side of the second area-divided filter,
   the third lens unit set parallel to the fourth lens unit by setting a light axis of the third lens unit parallel to a light axis of the fourth lens unit,
   the second light synthesis unit reflecting light coming from the third lens unit 90 degrees, and further reflecting the light 90 degrees to guide a S-polarized light component of the light to the second area-divided filter,
   the second light synthesis unit allowing and guiding a P-polarized light component of the light coming from the fourth lens unit to the second area-divided filter,
   the second area-divided filter including two polarizer area, one polarizer area letting through the S-polarized light component and another polarizer area letting through the P-polarized light component,
   the second area-divided filter separating the light coming from the second light synthesis unit into the S-polarized light component and the P-polarized light component,
   the second image capturing element receiving the S-polarized light component and the P-polarized light component, separated by the second area-divided filter, to detect a S-polarized light component image and a P-polarized light component image,
   wherein the first lens unit, second lens unit, third lens unit, and fourth lens unit are arranged in an x-axis direction, and
   wherein each of the first area-divided filter and the second area-divided filter are divided by a dividing line that extends parallel to the x-axis direction,
   the control unit including:
   a first controller; and
   a second controller,
   the first controller receiving the S-polarized light component image detected at the first image capturing element and the second image capturing element, and the first controller is configured to compute parallax of the object occurring between the first image capturing element and the second image capturing element so as to compute three-dimensional position data of the object,
   the second controller receiving the P-polarized light component image detected at the first image capturing element and at the second image capturing element, and the second controller is configured to compute parallax of the object occurring between the first image capturing element and the second image capturing element so as to compute three-dimensional position data of the object.

2. The stereo camera apparatus according to claim 1, wherein a focal length of the first lens unit of the first image capturing unit and a focal length of the third lens unit of the second image capturing unit are equal,
   a focal length of the second lens unit of the first image capturing unit and a focal length of the fourth lens unit of the second image capturing unit are equal, and
   the focal length of the first lens unit and the third lens unit are greater than the focal length of the second lens unit and the fourth lens unit.

3. The stereo camera apparatus according to claim 2, wherein a distance from a last lens of the first lens unit to the first image capturing element in the first image capturing unit and a distance from a last lens of the third lens unit to the second image capturing element in the second image capturing unit are equal,
   a distance from a last lens of the second lens unit to the first image capturing element in the first image capturing unit and a distance from a last lens of the fourth lens unit to the second image capturing element in the second image capturing unit are equal, and
   the distance from the last lens of the first lens unit to the first image capturing element and the distance from the last lens of the third lens unit to the second image capturing element are greater than the distance from the last lens of the second lens unit to the first image capturing element and the distance from the last lens of the fourth lens unit to the second image capturing element.

4. The stereo camera apparatus according to claim 1, wherein an arrangement order of the first lens unit and the second lens unit in the first image capturing unit, and the third lens unit and the fourth lens unit in the second image capturing unit is set in an order of the first lens unit, the second lens unit, the third lens unit, and the fourth lens unit.

5. The stereo camera apparatus according to claim 1, wherein the first lens unit and the second lens unit are integrated as one integrated unit in the first image capturing unit, and the third lens unit and the fourth lens unit are integrated as one integrated unit in the second image capturing unit.

6. The stereo camera apparatus according to claim 1, wherein the first light synthesis unit includes a prism and a light beam splitter, the prism includes a reflection face to reflect a light path of light 90 degrees, the light beam splitter includes a beam splitter face parallel to the reflection face of the prism, the beam splitter face reflects the S-polarized light component and lets through the P-polarized light component, and the prism and the light beam splitter are integrated as one integrated unit,
the second light synthesis unit includes a prism and a light beam splitter, the prism includes a reflection face to reflect a light path of light 90 degrees, the light beam splitter include a beam splitter face parallel to the reflection face of the prism, the beam splitter face reflects the S-polarized light component and lets through the P-polarized light component, and the prism and the light beam splitter are integrated as one integrated unit.

7. The stereo camera apparatus according to claim 6, wherein in the first image capturing unit, the first lens unit and the second lens unit are integrated with the first light synthesis unit, and in the second image capturing unit, the third lens unit and the fourth lens unit are integrated with the second light synthesis unit.

8. The stereo camera apparatus according to claim 1, wherein the first lens unit and the second lens unit are arranged in close proximity, and the third lens unit and the fourth lens unit are arranged in close proximity.

9. A vehicle-mountable monitoring apparatus to detect an object, comprising:
the stereo camera apparatus according to claim 1;
an image processing computer to process three-dimensional position data of the object obtained by the stereo camera apparatus; and
a display unit to display an image of the object based on the three-dimensional position data of the object computed by the image processing computer.

10. A stereo camera apparatus, comprising:
a first image capturing unit to capture an image of an object;
a second image capturing unit to capture an image of the object, the second image capturing unit spaced a given distance from the first image capturing unit; and
a control unit to receive and control processing of data of the image captured by the first image capturing unit and the second image capturing unit,
the first image capturing unit including:
a first lens unit;
a second lens unit, disposed next to the first lens unit;
a first light synthesis unit disposed after a light exit side of the first lens unit and second lens unit;
a first area-divided filter disposed after a light exit side of the first light synthesis unit; and
a first image capturing element disposed immediately after a light exit side of the first area-divided filter,
the first lens unit set parallel to the second lens unit by setting a light axis of the first lens unit parallel to a light axis of the second lens unit,
the first light synthesis unit reflecting light coming from the first lens unit 90 degrees, and further reflecting the light 90 degrees to guide a S-polarized light component of the light to the first area-divided filter,
the first light synthesis unit allowing and guiding a P-polarized light component of the light coming from the second lens unit to the first area-divided filter,
the first area-divided filter including two polarizer area, one polarizer area letting through the S-polarized light component and another polarizer area letting through the P-polarized light component,
the first area-divided filter separating the light coming from the first light synthesis unit into the S-polarized light component and the P-polarized light component,
the first image capturing element receiving the S-polarized light component and the P-polarized light component, separated by the first area-divided filter, to detect a S-polarized light component image and a P-polarized light component image,
the second image capturing unit including:
a third lens unit;
a fourth lens unit, disposed next to the third lens unit;
a second light synthesis unit disposed after a light exit side of the third lens unit and fourth lens unit;
a second area-divided filter disposed after a light exit side of the second light synthesis unit; and
a second image capturing element disposed immediately after a light exit side of the second area-divided filter,
the third lens unit set parallel to the fourth lens unit by setting a light axis of the third lens unit parallel to a light axis of the fourth lens unit,
the second light synthesis unit reflecting light coming from the third lens unit 90 degrees, and further reflecting the light 90 degrees to guide a S-polarized light component of the light to the second area-divided filter,
the second light synthesis unit allowing and guiding a P-polarized light component of the light coming from the fourth lens unit to the second area-divided filter,
the second area-divided filter including two polarizer area, one polarizer area letting through the S-polarized light component and another polarizer area letting through the P-polarized light component,
the second area-divided filter separating the light coming from the second light synthesis unit into the S-polarized light component and the P-polarized light component,
the second image capturing element receiving the S-polarized light component and the P-polarized light component, separated by the second area-divided filter, to detect a S-polarized light component image and a P-polarized light component image,
wherein the first lens unit, second lens unit, third lens unit, and fourth lens unit are arranged in an x-axis direction, and
wherein each of the first area-divided filter and the second area-divided filter are divided by a dividing line that extends parallel to the x-axis direction,
the control unit including:
a first controller; and
a second controller,
the first controller receiving the S-polarized light component image detected at the first image capturing element and the second image capturing element, and the first controller is configured to compute parallax of the object occurring between the first image capturing element and the second image capturing element so as to compute three-dimensional position data of the object, the second controller receiving the P-polarized light component image detected at the first image capturing element and at the second image capturing element, and the second controller is configured to compute parallax of the object occurring between the first image capturing element and the second image capturing element so as to compute three-dimensional position data of the object, the first light synthesis unit includes a prism and a light beam splitter, the prism includes a reflection face to reflect a light path of light 90 degrees, the light beam splitter includes a beam splitter face parallel to the reflection face of the prism, the beam splitter face reflects the S-polarized light component and lets through the P-polarized light component, and the prism and the light beam splitter are integrated as one integrated unit, the second light synthesis unit includes a prism and a light beam splitter, the prism includes a reflection face to reflect a light path of light 90 degrees, the light beam splitter include a beam splitter face parallel to the reflection face of the prism, the beam splitter face reflects the S-polarized light component and lets through the P-polarized light component, and the prism and the light beam splitter are integrated as one integrated unit.

11. The stereo camera apparatus according to claim 10, wherein the first lens unit and the second lens unit are arranged in close proximity, and the third lens unit and the fourth lens unit are arranged in close proximity.

* * * * *